United States Patent
Ishiji

(10) Patent No.: US 9,735,448 B2
(45) Date of Patent: Aug. 15, 2017

(54) ELECTROLYTIC SOLUTION FOR NON-AQUEOUS SECONDARY BATTERY, AND NON-AQUEOUS SECONDARY BATTERY

(71) Applicant: FUJIFILM Corporation, Tokyo (JP)

(72) Inventor: Yohei Ishiji, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 134 days.

(21) Appl. No.: 14/749,767

(22) Filed: Jun. 25, 2015

(65) Prior Publication Data

US 2015/0295276 A1 Oct. 15, 2015

Related U.S. Application Data

(63) Continuation of application No. PCT/JP2014/051651, filed on Jan. 27, 2014.

(30) Foreign Application Priority Data

Jan. 28, 2013 (JP) ................................. 2013-013730

(51) Int. Cl.
| | |
|---|---|
| *H01M 10/0567* | (2010.01) |
| *H01M 10/0525* | (2010.01) |
| *H01M 10/052* | (2010.01) |
| *H01M 2/16* | (2006.01) |
| *H01M 4/485* | (2010.01) |
| *H01M 4/505* | (2010.01) |

(Continued)

(52) U.S. Cl.
CPC ..... *H01M 10/0567* (2013.01); *H01M 10/052* (2013.01); *H01M 10/0525* (2013.01); *H01M 2/16* (2013.01); *H01M 4/485* (2013.01); *H01M 4/505* (2013.01); *H01M 4/525* (2013.01); *H01M 4/5825* (2013.01); *H01M 4/622* (2013.01); *H01M 10/0568* (2013.01); *H01M 10/0569* (2013.01); *H01M 10/4235* (2013.01); *H01M 2220/20* (2013.01); *H01M 2300/0025* (2013.01)

(58) Field of Classification Search
None
See application file for complete search history.

(56) References Cited

FOREIGN PATENT DOCUMENTS

| JP | 62-86673 A | 4/1987 |
| JP | 5-47416 A | 2/1993 |

(Continued)

OTHER PUBLICATIONS

Ei-Shahawi. "Spectroelectrochemistry of Nickel(II) Complexes of N,N'-Bis(salicylaldehyde)-o-Phenylenediamine and N,N'-Bis(2-hydroxy-1-naphthaldehyde)-o-Phenylenediamine Using an Optically Transparent Thin-layer Electrode". Analyst, Feb. 1994, vol. 119, p. 327-331.*

(Continued)

*Primary Examiner* — Patrick Ryan
*Assistant Examiner* — Christopher Domone
(74) *Attorney, Agent, or Firm* — Sughrue Mion, PLLC

(57) ABSTRACT

The present invention provides an electrolytic solution for a non-aqueous secondary battery, the electrolytic solution including: an organic metal compound; an electrolyte; and an organic solvent, in which the organic metal compound includes a central metal and a multidentate ligand, and the ligand includes an oxygen atom bonded to the central metal, and a nitrogen atom or a sulfur atom bonded to the central metal.

14 Claims, 2 Drawing Sheets

(51) Int. Cl.
   *H01M 4/525*    (2010.01)
   *H01M 4/58*     (2010.01)
   *H01M 4/62*     (2006.01)
   *H01M 10/0568*  (2010.01)
   *H01M 10/0569*  (2010.01)
   *H01M 10/42*    (2006.01)

(56) References Cited

FOREIGN PATENT DOCUMENTS

| JP | 2001-155772 A | 6/2001 |
| JP | 2003-115298 A | 4/2003 |
| JP | 2004-63432 A | 2/2004 |
| JP | 2007-265858 A | 10/2007 |

OTHER PUBLICATIONS

International Preliminary Report on Patentability and Written Opinion, issued Jul. 28, 2015, in International Application No. PCT/JP2014/051651, 13 pages in English and Japanese.
NEDO Road Map 2008 of Storage Cell Technology Development for Next-Generation Vehicles, Storage Cell Technique Development, Fuel Cell and Hydrogen Technology Development Department, New Energy and Industrial Technology Development Organization (Jul. 2009), 45 pgs.
International Search Report for PCT/JP2014/051651 dated Apr. 22, 2014, pages.
Written Opinion for PCT/JP2014/051651 dated Apr. 22, 2014.

\* cited by examiner

ELECTROLYTIC SOLUTION FOR NON-AQUEOUS SECONDARY BATTERY, AND NON-AQUEOUS SECONDARY BATTERY

CROSS-REFERENCE TO RELATED APPLICATIONS

This application is a Continuation of PCT International Application No. PCT/JP2014/051651 filed on Jan. 27, 2014, which claims priority under 35 U.S.C §119(a) to Japanese Patent Application No. 2013-013730 filed on Jan. 28, 2013. Each of the above application(s) is hereby expressly incorporated by reference, in its entirety, into the present application.

BACKGROUND OF THE INVENTION

1. Field of the Invention

The present invention relates to an electrolytic solution for a non-aqueous secondary battery (secondary cell) and a non-aqueous secondary battery.

2. Description of the Related Art

A lithium ion secondary battery can realize charging and discharging with higher energy density as compared to other secondary batteries (for example, a lead cell and a nickel-cadmium battery) of the related art. Using these characteristics, a lithium ion secondary battery is widely used as a portable electronic apparatus such as a mobile phone or a laptop computer. Recently, along with the expansion in use, a study has been actively made to improve battery characteristics of a lithium ion secondary battery. In particular, along with the expansion in use such as transport apparatuses including vehicles ("NEDO Road Map 2008 of Storage Cell Technology Development for Next-Generation Vehicles", Storage Cell Technique Development, Fuel Cell and Hydrogen Technology Development Department, New Energy and Industrial Technology Development Organization (July, 2009)), for example, further improvement of performance and safety relating to high-speed and high-capacity charging and discharging, and development of techniques corresponding to an increase in the potential of an electrode have been required.

As one of the prominent methods for improving battery characteristics of a lithium ion secondary battery, a technique of adding an additive to an electrolyte is proposed. In particular, although they are not intended to be used for automobiles and the like, for example, various additives have been studied to improve cycle characteristics among battery characteristics (refer to JP1987-86673A (JP-S62-86673A), JP2001-155772A, JP2004-63432A, JP2007-265858A, JP1993-47416A (JP-H05-47416A), and JP2003-115298A).

SUMMARY OF THE INVENTION

Until now, as a functional additive to be added for improving cycle characteristics, organic compounds having a low molecular weight such as benzophenone or succinic acid have been mainly studied (refer to JP1987-86673A (JP-S62-86673A), JP2001-155772A, JP2004-63432A, and JP2007-265858A). The action mechanisms of the organic compounds are not completely clear, and it is mainly considered that, when the organic compounds are used for a negative electrode, the effects thereof are exhibited. On the other hand, the present inventors thought that the use of the organic compounds not for a negative electrode but for a positive electrode is rather efficient for improvement of cycle characteristics (in particular, cycle characteristics during high-rate charging and discharging). Therefore, the present inventors advanced a study from this point of view. The present inventors assumed that an organic metal compound is promising as a material for a positive electrode from the viewpoint of physical properties, and made an attempt to specify materials which exhibit superior performance. Further, a material has been studied, which exhibits superior performance even when being optionally used as a high-potential positive electrode material (for example, lithium nickel manganese cobalt oxide) which has been recently used.

From this point of view, an object of the present invention is to provide an electrolytic solution for a non-aqueous secondary battery and a non-aqueous secondary battery, in which superior performance in cycle characteristics and high-rate discharging characteristics can be exhibited. In addition, another object of the present invention is to provide an electrolytic solution for a non-aqueous secondary battery and a non-aqueous secondary battery, in which the above-described superior performance can be exhibited even when a high-potential positive electrode material is optionally used.

The above-described problems are solved by the following means.

[1] An electrolytic solution for a non-aqueous secondary battery, the electrolytic solution including:
an organic metal compound;
an electrolyte; and
an organic solvent,
in which the organic metal compound includes a central metal and a multidentate ligand, and
the multidentate ligand includes an oxygen atom bonded to the central metal, and a nitrogen atom or a sulfur atom bonded to the central metal.

[2] The electrolytic solution for a non-aqueous secondary battery according to [1],
in which the organic metal compound is a compound represented by the following formula (1),

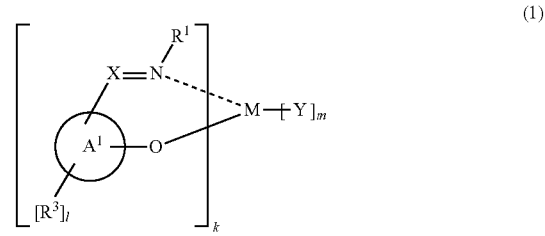

where in the formula (1), M represents the central metal; $A^1$ represents an aromatic ring or an aromatic heterocyclic ring; $R^1$ represents an alkyl group, an aryl group, a heteroaryl group, or an alkenyl group; when plural $R^1$'s are present, $R^1$'s may be bonded or condensed to each other or the plural $R^1$'s may form a ring; X represents $CR^2$ or a nitrogen atom; $R^2$ represents a hydrogen atom, an alkyl group, an alkenyl group, a hydroxyl group, an alkoxy group, an aryloxy group, a thiol group, an alkylthio group, or an arylthio group; $R^1$ and $R^2$ may be bonded or condensed to each other to form a ring; $R^3$ represents a substituent; Y represents a monodentate ligand; k represents an integer of 1 to 4; l represents an integer of 0 to 3; and m represents an integer of 0 to 2.

[3] The electrolytic solution for a non-aqueous secondary battery according to [2], in which the formula (1) represents any one of the following formulae (2) to (5), (2)
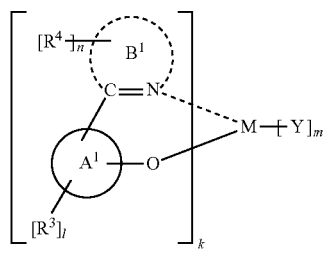

(3)
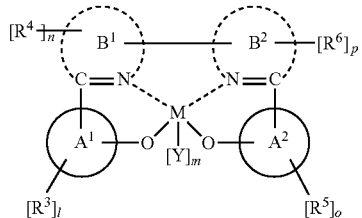

(4)
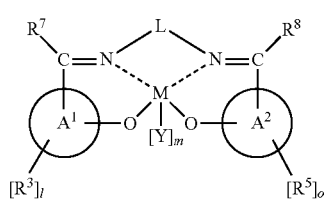

(5)
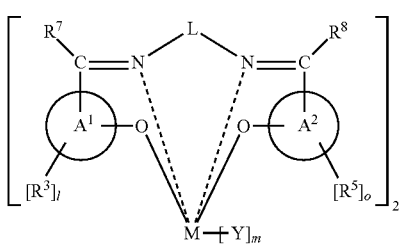

where M, $A^1$, $R^3$, Y, k, l, and m have the same definitions as those in the formula (1), respectively; $A^2$ has the same definition as $A^1$ in the formula (1); $B^1$ and $B^2$ represent a nitrogen-containing aromatic heterocyclic ring; $R^4$ to $R^6$ have the same definition as $R^3$ in the formula (1); $R^4$ and $R^6$ may be bonded or condensed to each other to form a ring with a portion of $B^1$ and $B^2$; $R^7$ and $R^8$ each independently has the same definition as $R^2$ in the formula (1); L represents an alkylene group, an arylene group, a heteroarylene group, or an alkenylene group; and n, o, and p each independently represents an integer of 0 to 3.

[4] The electrolytic solution for a non-aqueous secondary battery according to [3], in which the organic metal compound is a compound represented by the following formula (2-1), (2-2), (3-1), (3-2), (4-1), (4-2), (5-1), or (5-2), (2-1)
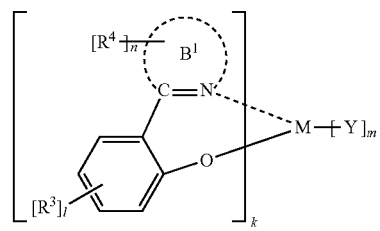

(2-2)
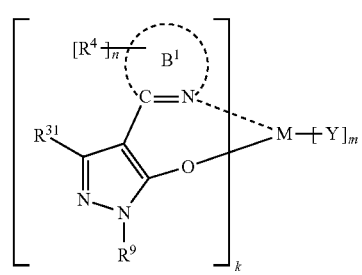

(3-1)
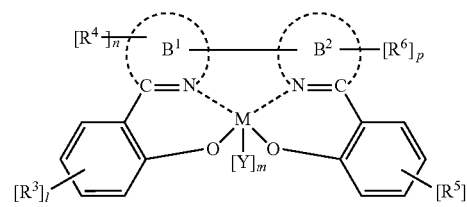

(3-2)
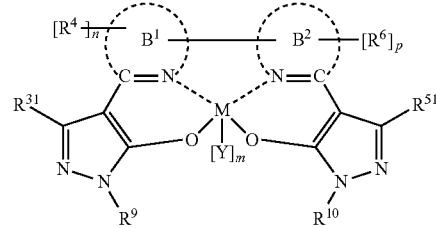

(4-1)
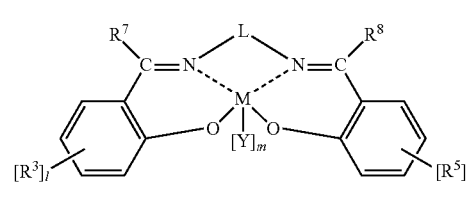

(4-2)
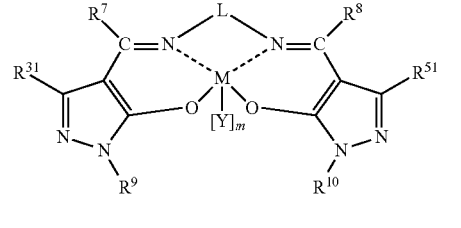

(5-1)
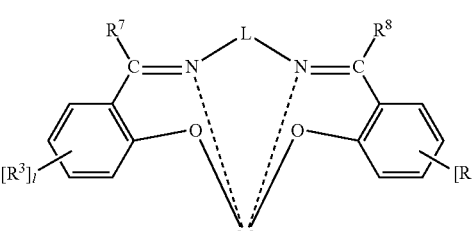

-continued

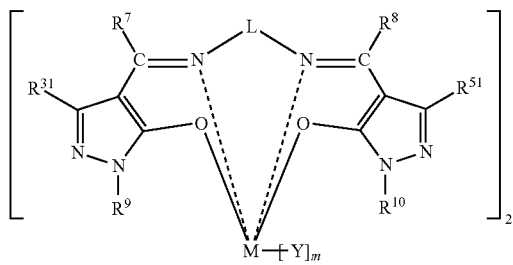

(5-2)

where M, $B^1$, $B^2$, $R^3$ to $R^8$, L, Y, k, l, m, n, o, and p have the same definitions as those in the formulae (2) to (5), respectively; $R^9$ and $R^{10}$ each independently represents an alkyl group, an aryl group, or a heteroaryl group; and $R^{31}$ and $R^{51}$ each independently represents the substituent represented by $R^3$ in the formula (1) or a hydrogen atom.

[5] The electrolytic solution for a non-aqueous secondary battery according to [4],
in which the organic metal compound is a compound represented by the formula (4-1) or (4-2).

[6] The electrolytic solution for a non-aqueous secondary battery according to any one of [3] to [5],
in which L represents a cycloalkylene group or an arylene group.

[7] The electrolytic solution for a non-aqueous secondary battery according to any one of [1] to [6],
in which the central metal is a transition element in Group 4 to Group 8 or a rare earth metal element.

[8] The electrolytic solution for a non-aqueous secondary battery according to any one of [1] to [7],
in which the central metal is V Cr, Ti, Zr, or Hf.

[9] The electrolytic solution for a non-aqueous secondary battery according to any one of [1] to [8],
in which the content of the organic metal compound is 0.0001 mol/L to 0.5 mol/L with respect to a total amount of the electrolytic solution.

[10] The electrolytic solution for a non-aqueous secondary battery according to any one of [1] to [9], the electrolytic solution further including:
at least one of an aromatic compound, a halogen-containing compound, an imide compound, a phosphorus-containing compound, a sulfur-containing compound, a silicon-containing compound, a nitrile compound, and a polymerizable compound.

[11] A non-aqueous secondary battery including:
a positive electrode;
a negative electrode; and
the electrolytic solution according to any one of [1] to [10].

[12] The non-aqueous secondary battery according to [11],
in which the positive electrode contains an active material,
the active material contains a transition metal oxide represented by any one of the following formulae (MA) to (MC):

$$Li_aM^1O_b \quad \text{(MA)};$$

$$Li_cM^2{}_2O_d \quad \text{(MB); and}$$

$$Li_eM^3(PO_4)_f \quad \text{(MC),}$$

where $M^1$ and $M^2$ each independently represents one or more elements selected from Co, Ni, Fe, Mn, Cu, and V; $M^3$ each independently represents one or more elements selected from V, Ti, Cr, Mn, Fe, Co, Ni, and Cu; a represents 0.02 to 1.2; b represents 1 to 3; c represents 0.02 to 2; d represents 3 to 5; e represents 0 to 2; and f represents 1 to 5.

[13] The non-aqueous secondary battery according to [11] or [12],
in which the positive electrode contains an active material,
the active material is lithium cobalt oxide, lithium manganese oxide, lithium nickel oxide, lithium nickel manganese cobalt oxide, lithium manganese nickel oxide, lithium nickel cobalt aluminum oxide, or lithium vanadium phosphate.

[14] The non-aqueous secondary battery according to any one of [11] to [13],
having 4.25 V to 5.0 V vs. Li/Li+ of a charging potential during normal charging.

According to the present invention, an electrolytic solution for a non-aqueous secondary battery and a non-aqueous secondary battery using the same can be provided, in which superior performance in cycle characteristics and high-rate discharging characteristics can be exhibited. In addition, an electrolytic solution for a non-aqueous secondary battery and a non-aqueous secondary battery can be provided, in which the above-described superior performance can be exhibited even when a high-potential positive electrode material is optionally used.

The above-described and other characteristics and advantageous effects of the present invention will be clarified from the following description and the accompanying drawings.

DESCRIPTION OF THE PREFERRED EMBODIMENTS

Electrolytic Solution for Non-Aqueous Secondary Battery

Figure 1:
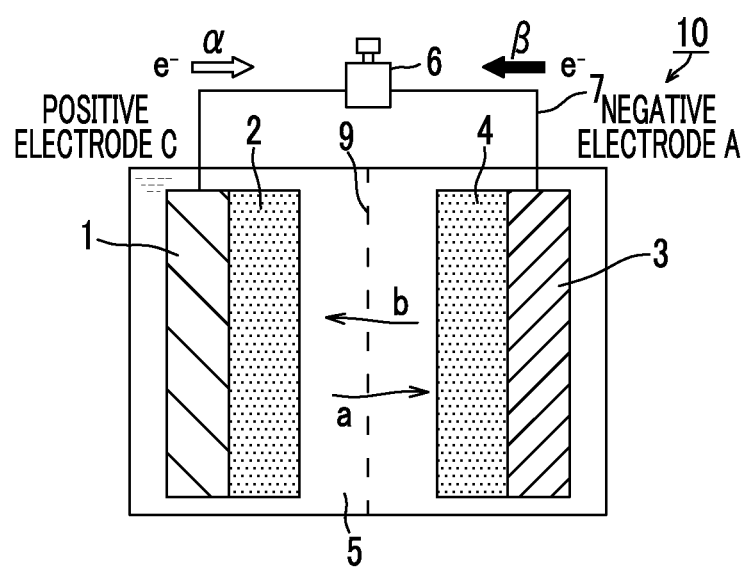
FIG. 1 is a cross-sectional view schematically showing a mechanism of a lithium ion secondary battery according to a preferred embodiment of the present invention.

An electrolytic solution for a non-aqueous secondary battery according to the present invention includes a specific organic metal compound, an electrolyte, and a specific organic solvent. Hereinafter, the preferred embodiment of the present invention will be described.

(Specific Organic Metal Compound)

In the present invention, the specific organic metal compound to be applied includes a central metal and a multidentate ligand, and the ligand includes an oxygen atom bonded to the central metal, and a nitrogen atom or a sulfur atom bonded to the central metal. The specific organic metal compound may include a bond between the central metal and the carbon atom in addition to the bonds between the central metal and the respective atoms. Here, the bonds between the central metal and the respective atoms may be a covalent bond or a coordinate bond. The covalent bond may be a bond formed by atoms sharing a pair of electrons. The coordinate bond is a bond in which only one of two atoms which form the bond donates bonding electrons to a molecular orbital.

The specific organic metal compound includes a central metal, and this central metal is preferably a transition element or a rare earth metal element. In the present invention, "central metal" includes not only the form of only a metal element but also a metal compound such as a metal oxide having a metal element.

The specific organic metal compound preferably includes a multidentate ligand having a structural unit represented by the following formula (L). Here, the multidentate ligand is preferably one of bidentate to tetradentate ligands.

$$*-E-A^1-X=N(R^1)-* \tag{L}$$

In the formula (L), $A^1$, X, and le are the same as described below in the following formula (1), and preferable examples thereof are the same as described below. * represents a binding site with the central metal. E represents an oxygen atom or a sulfur atom.

The specific organic metal compound is preferably a compound represented by the following formula (1).

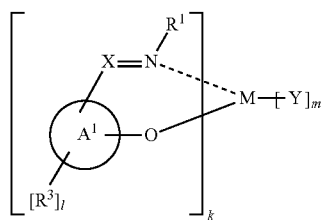

(1)

M

In the formula (1), M represents the central metal. In the present invention, as described above, "central metal" includes not only a metal element but also a metal oxide. The central metal is preferably a transition element or a rare earth metal element. Specific examples of the transition element include Group 4 transition elements (for example, Ti, Zr, or Hf), Group 5 transition elements (for example, V, Nb, or Ta), Group 6 transition elements (for example, Cr or Mo), Group 7 transition elements (for example, Mn), Group 8 transition elements (for example, Fe or Ru), Group 11 transition elements (for example, Cu), and Group 12 transition elements (for example, Zn). Among these, transition elements in Group 4 to Group 8 are preferable, and Ti, Zr, Hf, V, and Cr are more preferable. Specific examples of the rare earth metal element include lanthanoid elements (for example, Y, La, Ce, Sw, Nd, Lu, Er, Yb, and Gd). Among these, Ce, Gd, and Er are preferable. Examples of the metal oxide include oxides of the above-described exemplary metal elements, and oxides of the exemplary metal elements in the preferable range are preferable.

Examples of the central metal will be collectively described below. Transition elements in Group 4 to Group 8 or lanthanoid elements are more preferable; Ti, Zr, ZrO, Hf, HfO, V, Nb, NbO, Ta, Cr, Mo, MoO, Mn, Fe, Ru, Cu, Zn, Ce, Gd, and Er are still more preferable; Ti, Zr, ZrO, Hf, V, Cr, Fe, and Ce are particularly preferable; and Ti, Zr, Hf, V, and Cr are most preferable.

$A^1$

In the formula (1), $A^1$ represents an aromatic ring or an aromatic heterocyclic ring. As the aromatic ring, an aromatic ring having 6 to 14 carbon atoms is preferable, and specific examples thereof include a benzene ring, a naphthalene ring, and an anthracene ring. Among these, a benzene ring is more preferable. As the aromatic heterocyclic ring, an aromatic heterocyclic ring having 2 to 12 carbon atoms is preferable, and specific examples thereof include a pyrrole ring, a thiophene ring, a thiazole ring, an oxazole ring, a thiadiazole ring, an oxadiazole ring, an imidazole ring, a pyrazole ring, a triazole ring, a tetrazole ring, a pyridine ring, a pyrimidine ring, a pyrazine ring, a triazine ring, a benzoxazole ring, a benzothiazole ring, a benzoimidazole ring, and a benzopyrazole ring. Among these, a pyrazole ring, (an imidazole ring, an oxazole ring, or a pyridine ring) is more preferable, and a pyrazole ring is still more preferable. As $A^1$, a benzene ring or a pyrazole ring is preferable, and a benzene ring is more preferable.

Preferable specific examples of $A^1$ are as follows.

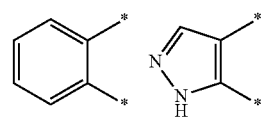

Here, * represents a direct bond with X or an oxygen atom. At this time, a pyrazole ring or a benzene ring may have a substituent T.

$R^1$

In the formula (1), le represents an alkyl group, an aryl group, a heteroaryl group, or an alkenyl group. The alkyl group may have a linear structure, a branched structure, or a cyclic structure. As the alkyl group, an alkyl group having 1 to 10 carbon atoms is preferable, and an alkyl group having 1 to 6 carbon atoms or a cycloalkyl group having 3 to 6 carbon atoms is more preferable. Specific examples of the alkyl group having 1 to 6 carbon atoms include methyl, ethyl, propyl, isopropyl, butyl, t-butyl, pentyl, and hexyl. Among these, methyl or ethyl is preferable. Specific examples of the cycloalkyl group having 3 to 6 carbon atoms include cyclopropyl, cyclopentyl, and cyclohexyl. Among these, cyclohexyl is preferable. As the aryl group, an aryl group having 6 to 14 carbon atoms is preferable, and specific examples thereof include phenyl, naphthyl, and anthracenyl. Among these, phenyl is more preferable. As the heteroaryl group, a heteroaryl group having 1 to 12 carbon atoms is preferable, and specific examples of a compound forming a ring include pyrrole, thiophene, thiazole, oxazole, thiadiazole, oxadiazole, imidazole, pyrazole, triazole, tetrazole, pyridine, pyrimidine, pyrazine, triazine, benzoxazole, benzothiazole, benzoimidazole, and benzopyrazole. Among these, triazine or pyrazine is more preferable. As the alkenyl group, an alkenyl group having 2 to 6 carbon atoms is preferable, and specific examples thereof include ethenyl, 1-propenyl, 2-propenyl, 1-butenyl, 2-butenyl, 1-pentenyl, 2-pentenyl, 1-hexenyl, and 3-hexenyl. Among these, ethenyl is more preferable. Each of the above-described groups may further have a substituent, and examples thereof include an alkyl group (preferably methyl, ethyl, isopropyl, or cyclohexyl), an alkoxy group (preferably methoxy or ethoxy), an aryl group (preferably phenyl), and a halogen atom (preferably a fluorine atom, a chlorine atom, or a bromine atom). When plural $R^1$'s are present in the molecules, $R^1$'s may be bonded or condensed to each other. At this time, $R^1$'s may form a ring. When a case where $R^1$'s are bonded or condensed between adjacent ligands is also considered, as $R^1$, an alkyl group, an aryl group, or an alkenyl group is preferable, an cycloalkyl group having 3 to 6 carbon atoms, an aryl group having 6 to14 carbon atoms, or an alkenyl group having 2 to 6 carbon atoms is more preferable, and a cyclohexyl group, a phenyl group, or an ethenyl group is still more preferable.

X

X represents $CR^2$ or a nitrogen atom. As X, $CR^2$ is preferable.

$R^2$ $R^2$ represents a hydrogen atom, an alkyl group, an alkenyl group, a hydroxyl group, an alkoxy group, an aryloxy group, a thiol group, an alkylthio group, or an arylthio group. The alkyl group may have a linear structure, a branched structure, or a cyclic structure. As the alkyl group, an alkyl group having 1 to 10 carbon atoms is preferable, and an alkyl group having 1 to 6 carbon atoms or a cycloalkyl group having 3 to 6 carbon atoms is more preferable. Specific examples of the alkyl group having 1 to 6 carbon atoms include methyl, ethyl, propyl, isopropyl, butyl, t-butyl, pentyl, and hexyl. Among these, methyl or ethyl is preferable. Specific examples of the cycloalkyl group having 3 to 6 carbon atoms include cyclopropyl, cyclopentyl, and cyclohexyl. Among these, cyclohexyl is preferable. As the alkenyl group, an alkenyl group having 2 to 6 carbon atoms is preferable, and specific examples thereof include ethenyl, 1-propenyl, 2-propenyl, 1-butenyl, 2-butenyl, 1-pentenyl, 2-pentenyl, 1-hexenyl, and 3-hexenyl. Among these, ethenyl is more preferable. As the alkoxy group, an alkoxy group having 1 to 6 carbon atoms is preferable, and specific examples thereof include methoxy, ethoxy, propyloxy, isopropyloxy, and cyclohexyloxy. Among these, methoxy, or ethoxy is more preferable. As the aryloxy group, an aryloxy group having 6 to 14 carbon atoms is preferable, and specific examples thereof include phenoxy and naphthoxy. Among these, phenoxy is more preferable. As the alkylthio group, an alkylthio group having 1 to 6 carbon atoms is preferable, and specific examples thereof include methylthio, ethylthio, propylthio, isopropylthio, butylthio, t-butylthio, pentylthio, and hexylthio. Among these, methylthio or ethylthio is preferable. As the arylthio group, an arylthio group having 6 to 14 carbon atoms is preferable, and specific examples thereof include phenylthio and naphthylthio. Among these, phenylthio is more preferable. As $R^2$, a hydrogen atom, a hydroxyl group, or a thiol group is preferable, and a hydrogen atom is more preferable.

$R^2$ may be bonded or condensed to $R^1$ to form a ring. As the ring, a heterocyclic ring is formed, and a nitrogen-containing aromatic heterocyclic ring is preferably formed. As the ring to be formed, a pyrrole ring, a pyrazole ring, an imidazole ring, a thiazole ring, an oxazole ring, a thiadiazole ring, an oxadiazole ring, a triazole ring, a tetrazole ring, a pyridine ring, a pyrimidine ring, a pyrazine ring, a triazine ring, a benzoxazole ring, a benzothiazole ring, a benzoimidazole ring, a benzopyrazole ring, a quinoline ring, or an isoquinoline ring is preferable, and a pyridine ring, a benzoxazole ring, or a benzothiazole ring is more preferable.

$R^3$ $R^3$ represents a substituent. As $R^3$, an alkyl group, an alkoxy group, an aryl group, an alkenyl group, or a halogen atom is preferable, an alkyl group having 1 to 6 carbon atoms, an alkoxy group having 1 to 6 carbon atoms, an aryl group having 6 to 12 carbon atoms, or an alkenyl group having 2 to 6 carbon atoms is more preferable, and methyl, ethyl, propyl, isopropyl, isobutyl, t-butyl, perfluoromethyl, methoxy, phenyl, or ethenyl is still more preferable. Each of the above-described groups may further have a substituent, and examples thereof include an alkyl group (preferably methyl, ethyl, isopropyl, or cyclohexyl), an alkoxy group (preferably methoxy or ethoxy), an aryl group (preferably phenyl), and a halogen atom (preferably a fluorine atom, a chlorine atom, or a bromine atom). When plural $R^3$'s are present, $R^3$'s may be bonded or condensed to each other to form a ring.

Y

Y represents a monodentate ligand. Specific examples of Y include a hydrogen atom, an alkyl group (preferably having 1 to 6 carbon atoms), an alkenyl group (preferably having 2 to 6 carbon atoms), an alkoxy group (preferably having 1 to 6 carbon atoms), an alkylamino group (preferably having 2 to 10 carbon atoms), a silylamino group (preferably having 0 to 10 carbon atoms), a sulfonic acid group, an isocyanic acid group (NCO), an isothiocyanic acid group (NCS), a sulfanyl group (Ra—S—) (preferably having 1 to 6 carbon atoms), a phosphinyl group (RaO(Ra)PO—) (preferably having 0 to 10 carbon atoms), a carbonyl group-containing group (Ra—CO—) (preferably having 1 to 6 carbon atoms), a halogen atom, an aryl group (preferably having 6 to 22 carbon atoms), and a heteroaryl group (preferably having 3 to 8 carbon atoms). Here, Ra represents an alkyl group (preferably having 1 to 6 carbon atoms). As Y, an alkyl group having 1 to 6 carbon atoms or a bis(trialkylsilyl)amino group is preferable, and a methyl group or a bis(trimethylsilyl)amino group is more preferable.

k k represents an integer of 1 to 4 and preferably an integer of 2 to 4. When k represents 2 or more, plural structural units defined therein may be the same as or different from each other.

l l represents an integer of 0 to 3 and preferably an integer of 0 to 2. When l represents 2 or more, plural structural units defined therein may be the same as or different from each other.

m m represents an integer of 0 to 2. When m represents 2 or more, plural structural units defined therein may be the same as or different from each other.

The formula (1) preferably represents any one of the following formulae (2) to (5).

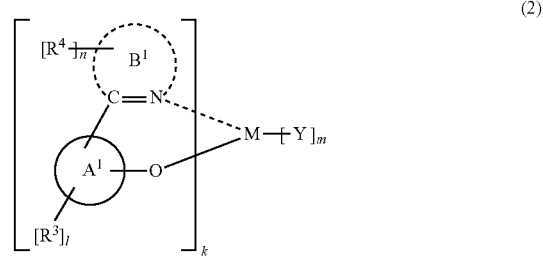

(2)

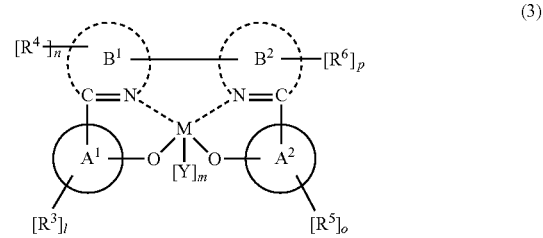

(3)

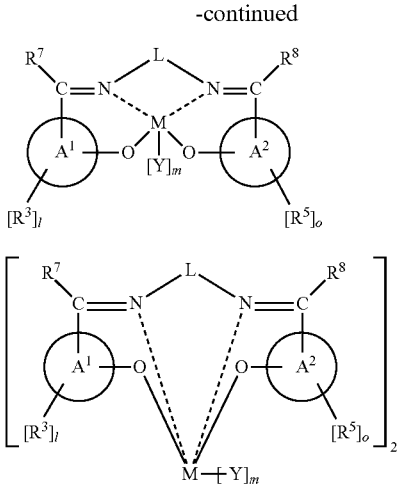

In the formulae (2) to (5), M, $A^1$, $R^3$, Y, k, l, and m have the same definitions and the same preferable ranges as those in the formula (1), respectively.

$A^2$ $A^2$ has the same definition and the same preferable range as $A^1$ in the formula (1), respectively.

$B^1$ and $B^2$ $B^1$ and $B^2$ each independently represents a nitrogen-containing aromatic heterocyclic ring. The nitrogen-containing aromatic heterocyclic ring may contain not only a nitrogen atom but also a hetero atom such as an oxygen atom or a sulfur atom in the ring structure. As the nitrogen-containing aromatic heterocyclic ring, a nitrogen-containing aromatic heterocyclic ring having 1 to 12 carbon atoms is preferable, and specific examples thereof include a pyrrole ring, a pyrazole ring, an imidazole ring, a thiazole ring, an oxazole ring, a thiadiazole ring, an oxadiazole ring, a triazole ring, a tetrazole ring, a pyridine ring, a pyrimidine ring, a pyrazine ring, a triazine ring, a benzoxazole ring, a benzothiazole ring, a benzoimidazole ring, a benzopyrazole ring, a quinoline ring, and an isoquinoline ring. Among these, a pyridine ring, a benzoxazole ring, a benzothiazole ring, or a quinoline ring is more preferable, and a pyridine ring is still more preferable.

Preferable specific examples of $B^1$ and $B^2$ are as follows.

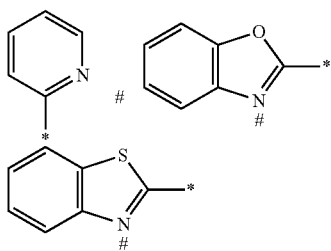

Here, * represents a direct bond with $A^1$ or $A^2$, and # represents a coordinate bond with the central metal. At this time, a pyridine ring or a benzene ring may have a substituent T.

$R^4$ to $R^6$ $R^4$ to $R^6$ have the same definition and the same preferable range as $R^3$ in the formula (1). $R^4$ and $R^6$ may be bonded or condensed to each other to form a ring with a portion of $B^1$ and $B^2$. As the ring to be formed, an aromatic ring is preferable, and a benzene ring is more preferable.

$R^7$ and $R^8$ $R^7$ and $R^8$ each independently has the same definition and the same preferable range as $R^2$ in the formula (1).

L

L represents an alkylene group, an arylene group, a heteroarylene group, or an alkenylene group. The alkylene group may have a linear structure, a branched structure, or a cyclic structure. As the alkylene group, an alkylene group having 1 to 10 carbon atoms is preferable, and an alkylene group having 1 to 6 carbon atoms or a cycloalkylene group having 3 to 6 carbon atoms is more preferable. Specific examples of the alkylene group having 1 to 6 carbon atoms include methylene, ethylene, propylene, isopropylene, butylene, pentylene, and hexylene. Among these, methylene or ethylene is preferable. Specific examples of the cycloalkylene group having 3 to 6 carbon atoms include cyclopropylene, cyclopentylene, and cyclohexylene. Among these, cyclohexylene is preferable. As the arylene group, an arylene group having 6 to 14 carbon atoms is preferable, and specific examples thereof include phenylene, naphthylene, and anthracenylene. Among these, phenylene is more preferable. As the heteroaryl group, a heteroarylene group having 1 to 12 carbon atoms is preferable. Specific examples of the heteroaryl group include pyrrole, thiophene, thiazole, oxazole, imidazole, pyrazole, pyridine, pyrimidine, pyrazine, triazine, benzoxazole, benzothiazole, benzoimidazole, and a linking group having a structure in which two hydrogen atoms are excluded from benzopyrazole. Among these, triazine or pyrazine is more preferable. As the alkenylene group, an alkenylene group having 2 to 6 carbon atoms is preferable, and specific examples thereof include ethenylene, 1-propenylene, 2-propenylene, 1-butenylene, 2-butenylene, 1-pentenylene, 2-pentenylene, 1-hexenylene, and 3-hexenylene. Among these, ethenylene is more preferable. Each of the above-described groups may further have a substituent, and examples thereof include an alkyl group (preferably methyl, ethyl, isopropyl, or cyclohexyl), an alkoxy group (preferably methoxy or ethoxy), an aryl group (preferably phenyl), and a halogen atom (preferably a fluorine atom, a chlorine atom, or a bromine atom). As L, an alkylene group or an arylene group is preferable, a cycloalkylene group having 3 to 6 carbon atoms or an arylene group having 6 to 14 carbon atoms is more preferable, and cyclohexylene or phenylene is still more preferable.

n, o, p n, o, and p each independently represents an integer of 0 to 3 and preferably an integer of 0 to 2. When n, o, and p represent 2 or more, plural structural units defined therein may be the same as or different from each other.

The formula (2) is preferably a compound represented by the following formula (2-1) or (2-2).

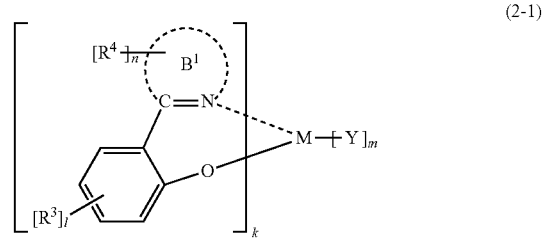

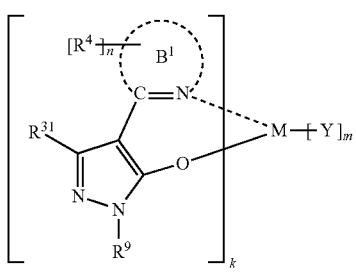
(2-2)

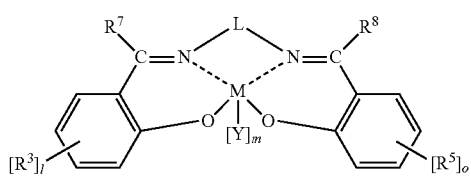
(4-1)

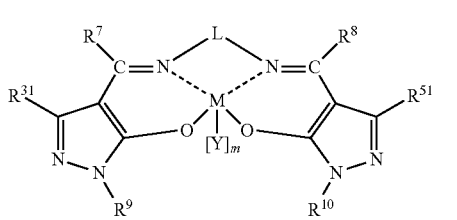
(4-2)

In the formula (2-1) or (2-2), M, B¹, R³, R⁴, Y, k, l, m, and n have the same definitions and the same preferable ranges as those in the formula (2), respectively. $R^{31}$ represents a hydrogen atom or the substituent represented by $R^3$ in the formula (1). At this time, the preferable range of the substituent is the same as that of the preferable substituent of $R^3$.

$R^9$ $R^9$ represents an alkyl group (preferably having 1 to 12 carbon atoms, more preferably having 1 to 6 carbon atoms, and still more preferably having 1 to 3 carbon atoms), an aryl group (preferably having 6 to 22 carbon atoms and more preferably having 6 to 14 carbon atoms), or a heteroaryl group (preferably having 1 to 12 carbon atoms and more preferably having 2 to 5 carbon atoms). As $R^9$, an alkyl group or an aryl group is preferable, and methyl or phenyl is more preferable.

The formula (3) preferably represents the following formula (3-1) or (3-2).

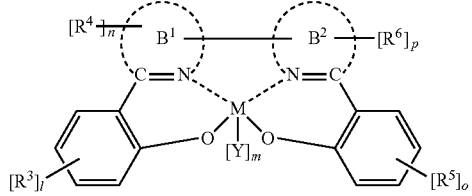
(3-1)

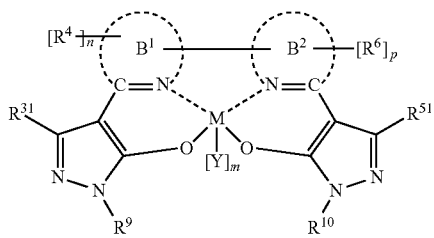
(3-2)

In the formula (3-1) or (3-2), M, B¹, B², R³, R⁴, R⁵, R⁶, Y, l, m, n, o, and p have the same definitions and the same preferable ranges as those in the formula (3), respectively. $R^9$ and $R^{10}$ each independently has the same definition and the same preferable range as $R^9$ in the formula (2-2). $R^{31}$ and $R^{51}$ each independently has the same definition and the same preferable range as $R^{31}$ in the formula (2-2).

The formula (4) preferably represents the following formula (4-1) or (4-2).

In the formula (4-1) or (4-2), M, R³, R⁵, R⁷, R⁸, L, Y, l, m, and o have the same definitions and the same preferable ranges as those in the formula (4), respectively. $R^9$ and $R^{10}$ each independently has the same definition and the same preferable range as $R^9$ in the formula (2-2). $R^{31}$ and $R^{51}$ each independently has the same definition and the same preferable range as $R^{31}$ in the formula (2-2).

The formula (5) preferably represents the following formula (5-1) or (5-2).

(5-1)

(5-2)

In the formula (5-1) or (5-2), M, R³, R⁵, R⁷, R⁸, L, Y, l, m, and o have the same definitions and the same preferable ranges as those in the formula (5), respectively. $R^9$ and $R^{10}$ each independently has the same definition and the same preferable range as $R^9$ in the formula (2-2). $R^{31}$ and $R^{51}$ each independently has the same definition and the same preferable range as $R^{31}$ in the formula (2-2).

Specific examples of the specific organic metal compound will be shown below, but the present invention is not intended to be limited thereto.

II-1
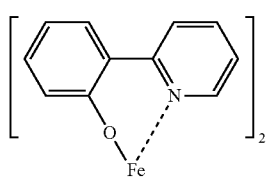
II-2
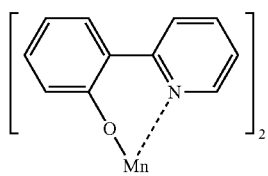
II-3
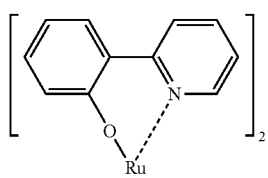
II-4
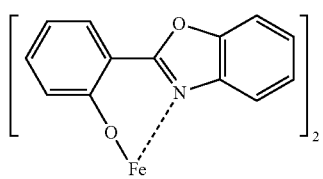
II-5
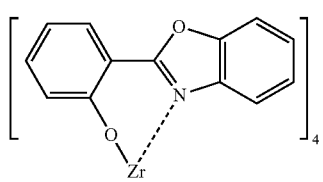
II-6
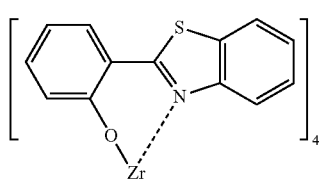
III-1
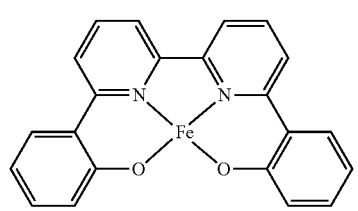
III-2
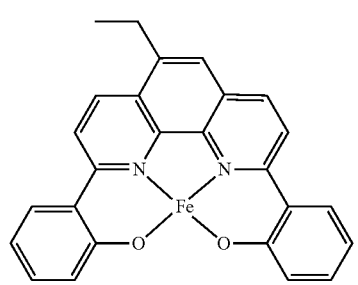
III-3
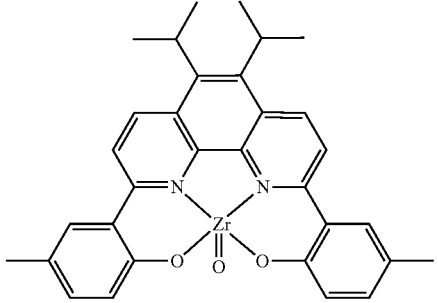
IV-1
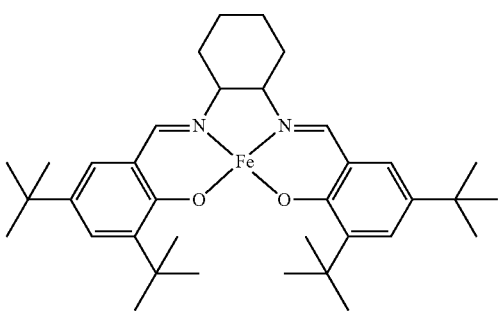
IV-2
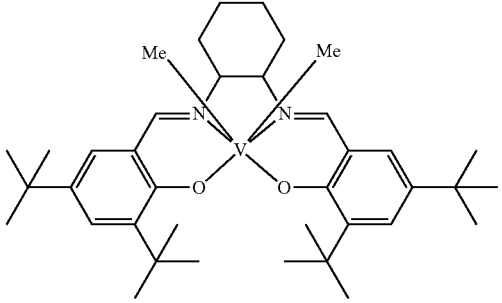
IV-3
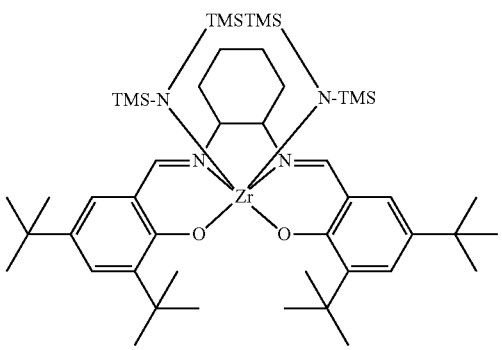

-continued
IV-4
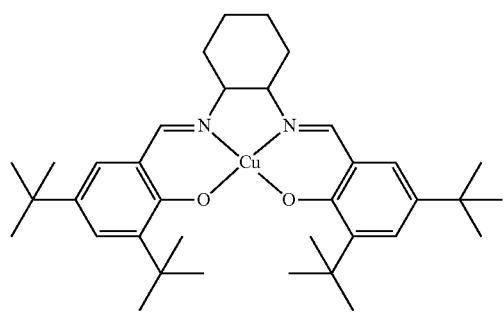
IV-5
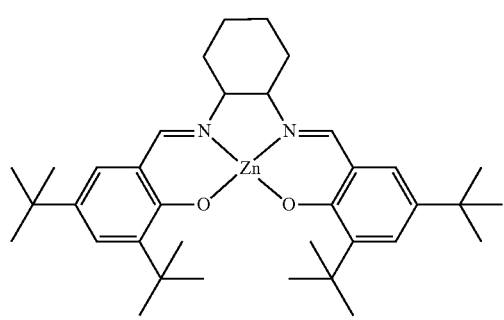
IV-6
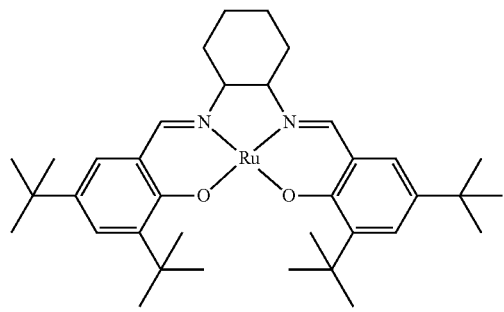
IV-7
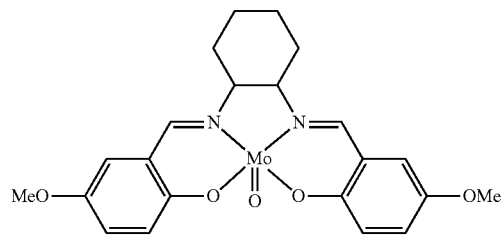
IV-8
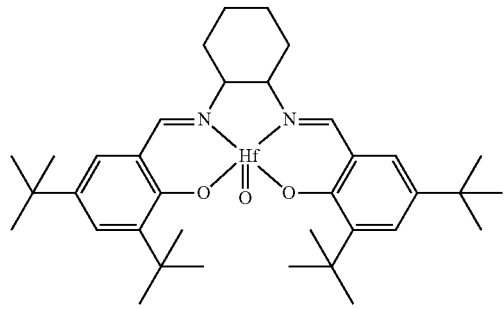
-continued
IV-9
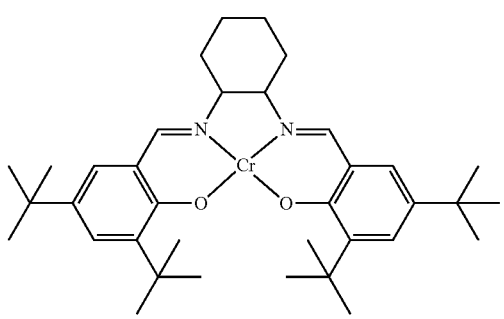
IV-10
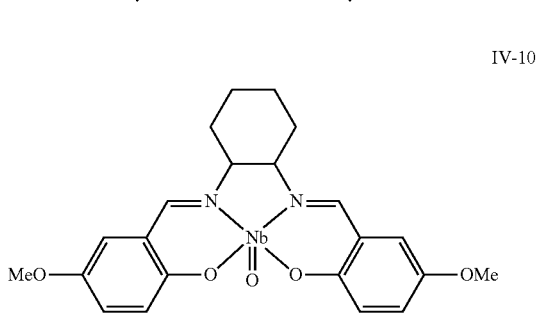
IV-11
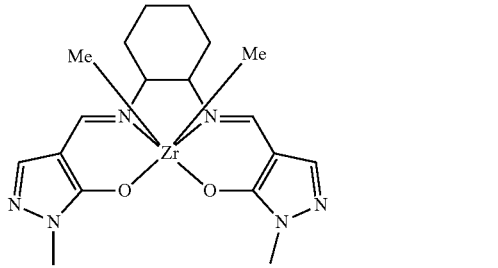
IV-12
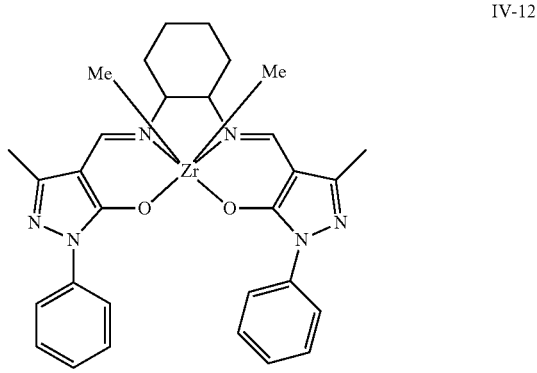
IV-13
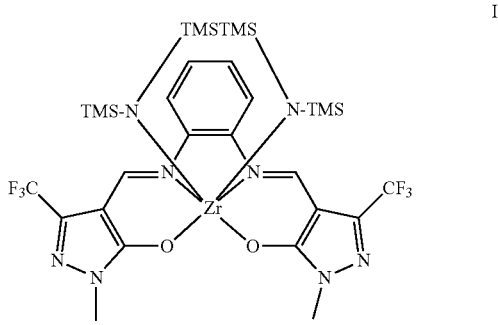

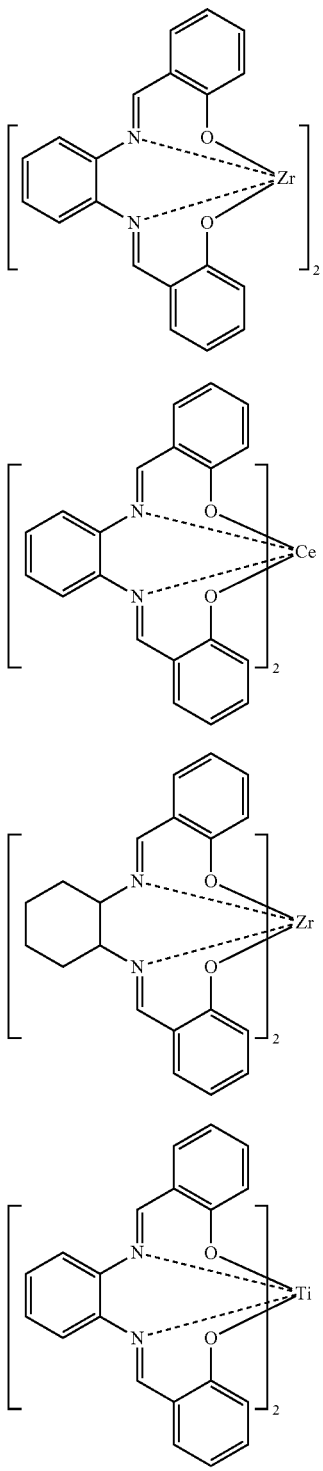

V-1

V-2

V-3

V-4

As the specific organic metal compound, a compound represented by the formula (4) or (5) is preferable, a compound represented by the formula (4) is more preferable, and a compound represented by the formula (4-1) or (4-2) is particularly preferable from the viewpoint of improving cycle characteristics and high-rate discharging characteristics.

The meaning of the compounds described in the present invention include not only the compounds themselves but also salts and ions thereof. In addition, derivatives obtained by modifying a predetermined part of the compounds within a range where the desired effects are exhibited are also included. The substituents or linking groups which are not specified in the present invention regarding whether to be substituted or unsubstituted may have an arbitrary substituent. The same shall be applied to the compounds which are not specified in the present invention regarding whether to be substituted or unsubstituted.

When a compound, a substituent, or the like in the present invention contains, for example, an alkyl group or an alkenyl group, these groups may be linear or branched or may be substituted or unsubstituted. In addition, when a compound, a substituent, or the like in the present invention contains, for example, an aryl group or a heteroaryl group, these groups may have a monocyclic or condensed ring and may be substituted or unsubstituted.

In the present invention, the content of the specific organic metal compound in the electrolytic solution is preferably 0.0001 mol/L or higher, more preferably 0.0005 mol/L or higher, and still more preferably 0.001 mol/L or higher. The upper limit is preferably 0.5 mol/L or lower, more preferably 0.1 mol/L or lower, and still more preferably 0.01 mol/L or lower. In the above-described range, a superior protective film of a positive electrode can be formed without interruption during the charging and discharging of a battery.

The specific organic metal compound can be synthesized while referring to a well-known document, for example, Inorg. Chem. 2001, 40, 1329-1333. In addition, a commercially available specific organic metal compound may be used.

In the present invention, the reason why the specific organic metal compound exhibits the superior effects is not clear, but is presumed to be that the specific organic metal compound brings about the effect of improving cycle characteristics in regard to chemical adsorption or electrolytic reaction on a positive electrode surface (it is considered that, particularly in a high-potential positive electrode, the above action is significant). That is, on a surface of an active material contained in a positive electrode, the specific organic metal compound is adsorbed on a site which is negatively ($\delta^-$) charged during normal charging and discharging. Due to oxidation on the site, some reaction is progressed, and a protective film is formed on a positive electrode surface using the specific organic metal compound as a base material. It is presumed that the formation of the protective film leads to the improvement of cycle characteristics.

In this specification, technical features including the selection of a substituent or a linking group of a compound, a temperature, and a thickness can be combined with each other although the lists thereof are individually described.

(Electrolyte)

The electrolytic solution according to the present invention contains an electrolyte. Examples of the electrolyte include metal ions and salts thereof. As the electrolyte, a metal ion in Group I or II of the periodic table or a salt thereof is preferable, a lithium salt, a potassium salt, a sodium salt, a calcium salt, or a magnesium salt is more preferable, and a lithium salt is still more preferable from the viewpoint of the output of a battery.

When the electrolytic solution according to the present invention is used as an electrolytic solution for a lithium ion secondary battery, a lithium salt may be selected as the electrolyte. The lithium salt is not particularly limited as long as it can be typically used as an electrolyte of an electrolytic solution for a lithium ion secondary battery. Examples of the lithium salt are as follows.

Inorganic lithium salts: inorganic fluoride salts such as $LiPF_6$, $LiBF_4$, $LiAsF_6$, and $LiSbF_6$; perhalogenate salts such as $LiClO_4$, $LiBrO_4$, and $LiIO_4$; and inorganic chloride salts such as $LiAlCl_4$.

Fluorine-containing organic lithium salts: perfluoroalkanesulfonate salts such as $LiRf^1SO_3$ (for example, $LiCF_3SO_3$); perfluoroalkanesulfonylimide salts such as $LiN(Rf^1SO_2)_2$ (for example, $LiN(CF_3SO_2)_2$ or $LiN(CF_3CF_2SO_2)_2$), $LiN(FSO_2)_2$, and $LiN(Rf^1SO_2)(Rf^2SO_2)_2$ (for example, $LiN(CF_3SO_2)(C_4F_9SO_2)$); perfluoroalkanesulfonylmethide salts such as $LiC(CF_3SO_2)_3$; and perfluoroalkyl fluorophosphates such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$. Here, $Rf^1$ and $Rf^2$ each independently represents a perfluoroalkyl group.

Oxalato borates: lithium bis(oxalato)borate and lithium difluoro(oxalato) borate.

Among these, $LiPF_6$, $LiBF_4$, $LiAsF_6$, $LiSbF_6$, $LiClO_4$, $LiRf^1SO_3$, $LiN(Rf^1SO_2)_2$, $LiN(FSO_2)_2$, and $LiN(Rf^1SO_2)(Rf^2SO_2)$ are preferable, and $LiPF_6$, $LiBF_4$, $LiN(Rf^1SO_2)_2$, $LiN(FSO_2)_2$, and $LiN(Rf^1SO_2)(Rf^2SO_2)$ are more preferable.

Among these lithium salts used in the electrolytic solution, one kind may be used alone, or two or more kinds may be used in an arbitrary combination.

The content of a metal ion in Group I or II of the periodic table or a metal salt thereof in the electrolytic solution can be appropriately selected according to the intended purpose of the electrolytic solution. In general, the content is preferably 10 mass % to 50 mass % and more preferably 15 mass % to 30 mass % with respect to the total mass of the electrolytic solution. When being evaluated as the ion concentration, the content may be calculated in terms of a salt thereof with a metal which is preferably used.

(Organic Solvent)

The organic solvent used in the present invention is preferably a non-protonic organic solvent and more preferably a non-protonic organic solvent having 2 to 10 carbon atoms. The organic solvent is preferably a compound having an ether group, a carbonyl group, an ester group, or a carbonate group. The compound may have a substituent, and examples thereof include the substituent T.

Examples of the organic solvent include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyl tetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyl oxazolidinone, N,N'-dimethylimidazolidinone, nitromethane, nitroethane, sulfolane, trimethyl phosphate, dimethyl sulfoxide, and dimethyl sulfoxide phosphate. Among these, one kind may be used alone, or two or more kinds may be used in combination. Among these, at least one selected from the group consisting of ethylene carbonate, propylene carbonate, dimethyl carbonate, diethyl carbonate, and ethyl methyl carbonate is preferable. In particular, a combination of a high viscosity (high dielectric constant) solvent (for example, relative dielectric constant c30) such as ethylene carbonate or propylene carbonate with a low viscosity solvent (for example, viscosity≤mPa·s) such as dimethyl carbonate, ethyl methyl carbonate, or diethyl carbonate is more preferable. This is because the dissociation of an electrolyte salt and the ionic mobility are improved.

However, the organic solvent used in the present invention is not limited to the above-described examples.

In addition, the organic solvent may contain a cyclic carbonic ester having an unsaturated bond because the chemical stability of the electrolytic solution is further improved. Examples of the cyclic carbonic ester having an unsaturated bond include at least one selected from the group consisting of a vinylene carbonate compound, a vinyl ethylene carbonate compound, and a methylene ethylene carbonate compound.

Examples of the vinylene carbonate compound include vinylene carbonate (1,3-dioxol-2-one), methyl vinylene carbonate (4-methyl-1,3-dioxol-2-one), ethyl vinylene carbonate (4-ethyl-1,3-dioxol-2-one), 4, 5-dimethyl-1,3 -dioxol-2-one, 4,5 -diethyl-1,3 -dioxol-2-one, 4-fluoro-1,3-dioxol-2-one, and 4-trifluoromethyl-1,3-dioxol-2-one.

Examples of the vinyl ethylene carbonate compound include vinyl ethylene carbonate (4-vinyl-1,3-dioxolan-2-one), 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3 -dioxolan-2-one, 4,4-divinyl-1,3-dioxolan-2-one, and 4,5-divinyl-1,3 -dioxolan-2-one.

Examples of the methylene ethylene carbonate compound include 4-methylene-1,3-dioxolan-2-one, 4,4-dimethyl-5 -methylene-1,3-dioxolan-2-one, and 4,4-diethyl-5-methylene-1,3-dioxolan-2-one.

Among these, one kind may be used alone, or a mixture of plural kinds may be used. Among these, vinylene carbonate is preferable.

When being is represented by a formula, an ester solvent preferably contains a compound represented by any one of the following formulae (4A) to (4C).

(4A)

(4B)

(4C)

$R^{31}$ to $R^{36}$

In the formulae (4A) to (4C), $R^{31}$ to $R^{36}$ each independently represents a hydrogen atom, an alkyl group that may be substituted with a fluorine atom, an alkyl group having an ether chain, or an aryl group that may be substituted with a fluorine atom. Preferable examples of the alkyl group and the aryl group are as follows. That is, among these, a linear or branched alkyl group, an alkyl group having a fluorine atom, or an alkyl group having an ether chain is preferable. An alkyl group having 1 to 6 carbon atoms (more preferably having 1 to 3 carbon atoms), an alkyl group having 1 to 6 carbon atoms (more preferably having 1 to 3 carbon atoms) that is partially substituted with a fluorine atom, or an alkyl group having 1 to 6 carbon atoms (more preferably 1 to 3 carbon atoms) that contains an ether group is more preferable. Adjacent substituents may form a ring. In particular, substituents $R^{31}$ and $R^{32}$ or substituents $R^{33}$ and $R^{34}$ in the formula (4B) may form a ring. In addition, substituents $R^{31}$ and $R^{32}$, substituents $R^{33}$ and $R^{34}$, or substituents $R^{35}$ and $R^{36}$ in the formula (4C) may form a ring.

(Functional Additives)

The electrolytic solution according to the present invention preferably contains the following functional additives (A) to (G). Examples of functions exhibited by the additives include a function of improving flame retardancy, a function of improving cycle characteristics, and a function of improving capacity characteristics. Some of the additives described below may also be used as the organic solvent but, in the present invention, can also be used as additives while being expected to exhibit the above-described functions.

<Aromatic Compound (A)>

Examples of the aromatic compound include a biphenyl compound and an alkyl-substituted benzene compound. The biphenyl compound has a partial structure in which two benzene rings are bonded to each other through a single bond. The benzene rings may have a sub stituent, and examples of a preferable sub stituent include an alkyl group having 1 to 4 carbon atoms (for example, methyl, ethyl, propyl, or t-butyl) and an aryl group having 6 to 10 carbon atoms (for example, phenyl or naphthyl).

Specific examples of the biphenyl compound include biphenyl, o-terphenyl, m-terphenyl, p-terphenyl, 4-methylbiphenyl, 4-ethylbiphenyl, and 4-tert-butylbiphenyl.

As the alkyl-substituted benzene compound, a benzene compound that is substituted with an alkyl group having 1 to 10 carbon atoms is preferable, and specific examples thereof include cyclohexylbenzene, t-amyl benzene, and t-butyl benzene.

<Halogen-Containing Compound (B)>

As the halogen atom contained in the halogen-containing compound, a fluorine atom, a chlorine atom, or a bromine atom is preferable, and a fluorine atom is more preferable. The number of halogen atoms is preferably 1 to 6 and more preferably 1 to 3. As the halogen-containing compound, a carbonate compound that is substituted with a fluorine atom, a polyether compound having a fluorine atom, or a fluorine-substituted aromatic compound is preferable.

As the halogen-containing compound, a halogen-substituted carbonate compound is preferable, which may be linear or branched. However, from the viewpoint of ion conductivity, a cyclic carbonate compound having high coordinating properties of an electrolyte salt (for example, a lithium ion) is preferable, and a 5-membered cyclic carbonate compound is more preferable.

Preferable examples of the halogen-substituted carbonate compound are as follows. Among these, compounds of Bex1 to Bex4 are more preferable, and Bex1 is still more preferable.

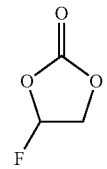

Bex1

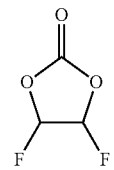

Bex2

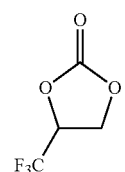

Bex3

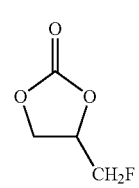

Bex4

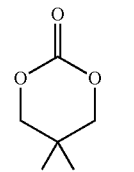

Bex5

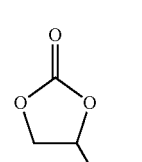

Bex6

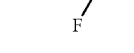

Bex7

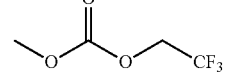

Bex8

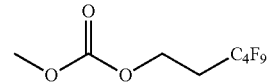

Bex9

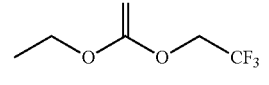

Bex10

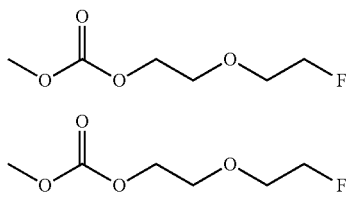

Bex11

Bex12

<Polymerizable Compound (C)>

As the polymerizable compound, a compound having a carbon-carbon double bond is preferable, a carbonate compound having a double bond such as vinylene carbonate or vinyl ethylene carbonate, a compound having a group selected from an acrylate group, a methacrylate group, a cyanoacrylate group, and an aCF$_3$ acrylate group, or a compound having a styryl group is more preferable, and a carbonate compound having a double bond or a compound having two or more polymerizable groups in the molecules is still more preferable.

<Phosphorus-Containing Compound (D)>

As the phosphorus-containing compound, a phosphate compound or a phosphazene compound is preferable. Preferable examples of the phosphate compound include trimethyl phosphate, triethyl phosphate, triphenyl phosphate, and tribenzyl phosphate. As the phosphorus-containing compound, a compound represented by the following formula (D2) or (D3) is also preferable.

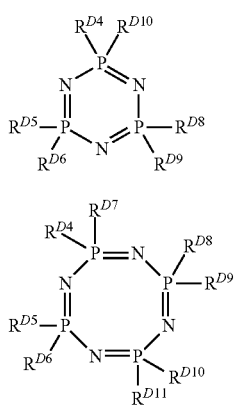

(D2)

(D3)

In the formulae (D2) and (D3), $R^{D4}$ to $R^{D11}$ represent a monovalent substituent. The monovalent substituent is preferably an alkyl group, an aryl group, an alkoxy group, an aryloxy group, an amino group, or a halogen atom such as a fluorine atom, a chlorine atom, or a bromine atom. At least one of substituents of $R^{D4}$ to $R^{D11}$ is preferably a fluorine atom and more preferably a substituent composed of an alkoxy group, an amino group, and a fluorine atom.

<Sulfur-Containing Compound (E)>

As the sulfur-containing compound, a compound having a —SO$_2$—, —SO$_3$—, or —OS(=O)O— bond is preferable, and a cyclic sulfur-containing compound such as propane sultone, propene sultone, or ethylene sulfite, or a sulfonic acid ester is more preferable.

As the cyclic sulfur-containing compound, a compound represented by the following formula (E1) or (E2) is preferable.

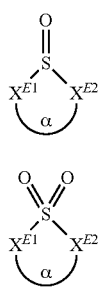

(E1)

(E2)

In the formula (E1) or (E2), $X^1$ and $X^2$ each independently represents —O— or —C(Ra)(Rb)—. Here, Ra and Rb each independently represents a hydrogen atom or a substituent. As the substituent, an alkyl group having 1 to 8 carbon atoms, a fluorine atom, or an aryl group having 6 to 12 carbon atoms is preferable. α represents an atom group required to form a 5-membered or 6-membered ring. A skeleton of α may contain not only a carbon atom but also a sulfur atom or an oxygen atom. α may have a substituent, and examples of the substituent include the substituent T. As the substituent, an alkyl group, a fluorine atom, or an aryl group is preferable.

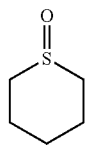

Eex1

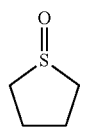

Eex2

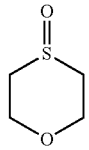

Eex3

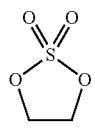

Eex4

Eex5

Eex6

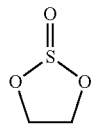

Eex7

-continued

Eex8

Eex9

Eex10

Eex11

Eex12

<Silicon-Containing Compound (F)>

As the silicon-containing compound, a compound represented by the following formula (F1) or (F2) is preferable.

$$R^{F1}O-\underset{R^{F2}}{\underset{|}{\overset{R^{F2}}{\overset{|}{Si}}}}-OR^{F1} \quad (F1)$$

$$R^{F1}O-\underset{R^{F2}}{\underset{|}{\overset{R^{F2}}{\overset{|}{Si}}}}-O-\underset{R^{F2}}{\underset{|}{\overset{R^{F2}}{\overset{|}{Si}}}}-OR^{F1} \quad (F2)$$

$R^{F1}$ represents an alkyl group, an alkenyl group, an acyl group, an acyloxy group, or an alkoxycarbonyl group.

$R^{F2}$ represents an alkyl group, an alkenyl group, an alkynyl group, or an alkoxy group.

Plural $R^{F1}$'s and $R^{F2}$'s which are present in the single formula may be the same as or different from each other, respectively.

<Nitrile Compound (G)>

As the nitrile compound, a compound represented by the following formula (G) is preferable.

$$R^{G1}\!-\!\underset{R^{G3}}{\underset{|}{\overset{R^{G2}}{\overset{|}{C}}}}\!\!\!\!\!\!\!\!-\!\!\text{CN} \quad (G)$$

In the formula (G), $R^{G1}$ to $R_{G3}$ each independently represents a hydrogen atom, an alkyl group, an alkoxycarbonyl group, an aryloxycarbonyl group, a cyano group, a carbamoyl group, a sulfonyl group, or a phosphonyl group. Preferable examples of each substituent can refer to the examples of the substituent T. Among these, one or more of $R^{G1}$ to $R^{G3}$ preferably represent a compound which contains plural nitrile groups having a cyano group.

ng represents an integer of 1 to 8.

Specific preferable examples of the compound represented by the formula (G) include acetonitrile, propionitrile, isobutyronitrile, succinonitrile, malononitrile, glutaronitrile, adiponitrile, 2-methylglutaronitrile, hexanetricarbonitrile, and propanetetracarbonitrile. Among these, succinonitrile, malononitrile, glutaronitrile, adiponitrile, 2-methylglutaronitrile, hexanetricarbonitrile, or propanetetracarbonitrile is more preferable.

The content of the functional additives is preferably 0.01 mol/L to 0.5 mol/L and more preferably 0.05 mol/L to 0.3 mol/L with respect to the total amount of the electrolytic solution.

The amount of the functional additives is preferably 200 parts by mass to 5000 parts by mass and more preferably 500 parts by mass to 2000 parts by mass with respect to 100 parts by mass of the specific organic metal compound from the viewpoint of the amount of a film formed on the surface of the electrode.

<Substituent T>

Examples of the substituent T are as follows.

An alkyl group (preferably an alkyl group having 1 to 20 carbon atoms, for example, methyl, ethyl, isopropyl, t-butyl, pentyl, heptyl, 1-ethylpentyl, benzyl, 2-ethoxyethyl, or 1-carboxymethyl); an alkenyl group (preferably an alkenyl group having 2 to 20 carbon atoms, for example, vinyl, allyl, or oleyl); an alkynyl group (preferably an alkynyl group having 2 to 20 carbon atoms, for example, ethynyl, butadiynyl, or phenyl-ethynyl); a cycloalkyl group (preferably a cycloalkyl group having 3 to 20 carbon atoms, for example, cyclopropyl, cyclopentyl, cyclohexyl, or 4-methylcyclohexyl); an aryl group (preferably an aryl group having 6 to 26 carbon atoms, for example, phenyl, 1-naphthyl, 4-methoxyphenyl, 2-chlorophenyl, or 3-methylphenyl); a heterocyclic group (preferably a heterocyclic group having 2 to 20 carbon atoms and more preferably a 5-membered or 6-membered heterocyclic group having at least one oxygen atom, sulfur atom, or nitrogen atom, for example, 2-pyridyl, 4-pyridyl, 2-imidazolyl, 2-benzimidazolyl, 2-thiazolyl, or 2-oxazolyl); an alkoxy group (preferably an alkoxy group having 1 to 20 carbon atoms, for example, methoxy, ethoxy, isopropyloxy, or benzyloxy); an aryloxy group (preferably an aryloxy group having 6 to 26 carbon atoms, for example, phenoxy, 1-naphthyloxy, 3-methylphenoxy, or 4-methoxyphenoxy); an alkoxycarbonyl group (preferably an alkoxycarbonyl group having 2 to 20 carbon atoms, for example, ethoxycarbonyl or 2-ethylhexyloxycarbonyl); an amino group (preferably an amino group having 0 to 20 carbon atoms, an alkylamino group, or an arylamino group, for example, amino, N,N-dimethylamino, N,N-diethylamino, N-ethylamino, or anilino); a sulfamoyl group (preferably a sulfamoyl group having 0 to 20 carbon atoms, for example, N,N-dimethylsulfamoyl or N-phenylsulfamoyl); an acyl group (preferably an acyl group having 1 to 20 carbon atoms, for example, acetyl, propionyl, butyryl, or benzoyl); an acyloxy group (preferably an acyloxy group having 1 to 20 carbon atoms, for example, acetyloxy or benzoyloxy); a carbamoyl group (preferably a carbamoyl group having 1 to 20 carbon atoms, for example, N,N-dimethylcarbamoyl or N-phenylcarbamoyl); an acylamino group (preferably an acylamino group having 1 to 20 carbon atoms, for example, acetylamino or benzoylamino); a sulfonamide group (preferably a sulfonamide group having 0 to 20 carbon atoms, for example, methanesulfonamide, benzenesulfonamide, N-methylmethanesulfonamide, or N-ethylbenzenesulfonamide); an alkylthio group (preferably an alkylthio group having 1 to 20 carbon atoms, for example, methylthio, ethylthio, isopropylthio, or benzylthio); an arylthio group (preferably an arylthio group having 6 to 26 carbon atoms, for example, phenylthio, 1-naphthylthio, 3-methylphenylthio, or 4-methoxyphenylthio); an alkylsulfonyl or arylsulfonyl group (preferably an alkylsulfonyl or arylsulfonyl group having 1 to 20 carbon atoms, for example, methylsulfonyl, ethylsulfonyl, or benzenesulfonyl); a hydroxyl group; a cyano group; and a halogen atom (for example, a fluorine atom, a chlorine atom, a bromine atom, or an iodine atom). Among these, an alkyl group, an alkenyl group, an aryl group, a heterocyclic group, an alkoxy group, an aryloxy group, an alkoxycarbonyl group, an amino group, an acylamino group, a hydroxyl group, or a halogen atom is more preferable, and an alkyl group, an alkenyl group, a heterocyclic group, an alkoxy group, an alkoxycarbonyl group, an amino group, an acylamino group, or an hydroxyl group is still more preferable.

In addition, each exemplary group of the substituent T may be further substituted with the substituent T.

(Other Functional Additives)

The electrolytic solution may contain at least one selected from a negative electrode film forming agent, a flame retardant, and an overcharge inhibitor. The content of each of these functional additives in the electrolytic solution is not particularly limited, but is preferably 0.001 mass % to 10 mass % with respect to the total mass of the electrolytic solution. Due to the addition of these compounds, the bursting and ignition of a battery during an abnormal situation caused by overcharge can be suppressed, and capacity retention characteristics and cycle characteristics after high-temperature storage can be improved.

[Method of Preparing Electrolytic Solution For Non-Aqueous Secondary Battery]

The electrolytic solution for a non-aqueous secondary battery can be prepared with a conventional method by dissolving the above-described respective components in an organic solvent for a non-aqueous electrolytic solution, the components including the example in which a lithium salt is used as a salt of a metal ion. Here, in the present invention, "non-aqueous" represents substantially not containing water. "Substantially not containing water" represents containing water within a range where the effects of the present invention do not deteriorate, in which the water content is preferably 200 ppm or less (in terms of mass) and more preferably 100 ppm or less. The lower limit is not particularly limited but, in practice, is 10 ppm or higher in consideration of unavoidable incorporation.

The viscosity of the electrolytic solution is not particularly limited, but the viscosity at 25° C. is preferably 0.1 mPa·s to 10 mPa·s and more preferably 0.5 mPa·s to 5 mPa·s.

In the present invention, the viscosity of the electrolytic solution is a value measured using the following measurement method unless specified otherwise.

<Method of Measuring Viscosity>

1 mL of a sample is put into a rheometer (CLS 500), and the viscosity thereof is measured using SteelCone (manufactured by TA Instruments) having a diameter of 4 cm/2°. The sample is warmed in advance until the temperature is constant at a measurement start temperature, and then the measurement is started. The measurement temperature is set as 25° C.

[Non-Aqueous Secondary Battery]

The non-aqueous secondary battery includes a positive electrode, a negative electrode, and an electrolytic solution. A lithium ion secondary battery which is an example of a preferred embodiment of the non-aqueous secondary battery will be described with reference to FIG. 1 schematically showing a mechanism thereof. However, FIG. 1 and the description based on FIG. 1 are not intended to limit the present invention.

The lithium ion secondary battery 10 includes: an electrolytic solution 5; a positive electrode C (including a positive electrode current collector 1 and a positive electrode active material layer 2) capable of storing and releasing lithium ions; and a negative electrode A (including a negative electrode current collector 3 and a negative electrode active material layer 4) capable of storing and releasing or dissolving or depositing lithium ions. In addition to these components, the lithium ion secondary battery 10 may further include, for example, a separator 9 that is disposed between the positive electrode and the negative electrode, a current collector terminal (not shown), and an outer case (not shown) in consideration of the intended use, shape, and the like of the battery. Optionally, a protective element may be mounted at least either inside or outside the battery. With such a structure, lithium ions in the electrolytic solution 5 are stored (a) and released (b), the battery can be charged ($\alpha$) and discharged ($\beta$), and an operating mechanism 6 can operate and store electricity through a circuit wiring 7.

(Battery Shape)

The battery shape which is applied to the non-aqueous secondary battery is not particularly limited and may be, for example, a bottomed cylindrical shape (coin shape), a bottomed square shape, a thin shape, a sheet shape, a paper shape, and a combination thereof. In addition, the shape of the non-aqueous secondary battery may be a horseshoe shape or a comb shape in consideration of the form of a system or an apparatus to be incorporated. From the viewpoints of efficiently dissipating heat generated in the battery to the outside, the battery shape is preferably a square shape such as a bottomed square shape or a thin shape and a bottomed cylindrical shape such as a coin shape having at least one relatively flat surface with a large area.

(Components Constituting Battery)

The non-aqueous secondary battery includes an electrolytic solution and an electrode mixture (positive electrode or negative electrode) and may further include a separator. Hereinafter, the respective components will be described.

(Electrode Mixture)

The electrode mixture is obtained by coating a current collector (electrode base material) with a dispersion (mixture) of an active material, a conductive material, a binder, a filler, and the like, which forms an active material layer, and forming the coated material into a sheet shape. In the non-aqueous secondary battery, typically, a positive electrode active material is used as an active material of the positive electrode, and a negative electrode active material is used as an active material of the negative electrode.

Next, the respective components (the active material, the conductive material, the binder, the filler, and the like) in the dispersion (mixture) which forms the active material layer will be described.

Positive Electrode Active Material

As the positive electrode active material, a transition metal oxide is preferably used. It is preferable that the transition metal oxide contains a transition element $M^a$ (at least one element selected from Co, Ni, Fe, Mn, Cu, and V). In addition, a mixing element $M^b$ (for example, alkali metals other than lithium (elements in Group 1 (IA) and Group 2 (IIA) in the periodic table), Al, Ga, In, Ge, Sn, Pb, Sb, Bi, Si, P, or B) may be mixed with the transition metal oxide. Examples of the transition metal oxide include a lithium-containing transition metal oxide and a non-lithium-containing transition metal oxide (for example, $V_2O_5$ or $MnO_2$) which contain a compound represented by any one of the following formulae (MA) to (MC). As the positive electrode active material, a particulate positive electrode active material may be used. Specifically, a transition metal oxide that can reversibly store and release lithium ions can be used, and a lithium-containing transition metal oxide is preferably used.

The positive electrode active material is preferably a material having a sufficient charging region or a transition metal oxide material that can store and release alkali metal ions. Specifically, the lithium-containing transition metal oxide has a lithium storage-release potential peak of preferably 3.5 V or higher, more preferably 3.8 V or higher, and most preferably 4.0 V or higher vs. lithium. At this time, the charge-discharge potential peak can be specified by preparing a three-electrode battery, which includes a working electrode, a reference electrode, and a counter electrode, and performing electrochemical measurement (cyclic voltammetry) thereon. The configuration of the three-electrode battery and the measurement conditions of the electrochemical measurement are as follows.

<Configuration of Three-Electrode Cell>
Working electrode: an active material electrode which is formed on a platinum electrode using a sol-gel method or a sputtering method
Reference electrode: lithium
Counter electrode: lithium
Dilution medium: EC/EMC=1/2, $LiPF_6$, 1M, manufactured by Kishida Chemical Co., Ltd.
<Measurement Conditions>
Scanning rate: 1 mV/s
Measurement temperature: 25° C.

As the lithium-containing transition metal oxide, for example, an oxide containing the transition element $M^a$ is preferable. At this time, the oxide containing the transition element Ma may be mixed with the mixing element $M^b$ (preferably Al). The mixing amount is preferably 0 mol % to 30 mol % with respect to the amount of the transition metal. It is more preferable that the lithium-containing transition metal oxide is synthesized by mixing the above components such that a molar ratio Li/Ma is 0.3 to 2.2.

[Transition Metal Oxide Represented by Formula (MA) (Layered Rock Salt Structure)]

As the lithium-containing transition metal oxide, a compound represented by the following formula (MA) is preferable.

$$Li_aM^1O_b \tag{MA}$$

In the formula (MA), $M^1$ has the same definition as Ma described above. a represents 0.02 to 1.2 and preferably 0.6 to 1.1. b represents 1 to 3 and preferably 2. A portion of $M^1$ may be substituted with the mixing element $M^b$. The transition metal oxide represented by the formula (MA) typically has a layered rock salt structure.

As the transition metal oxide represented by the formula (MA), a compound represented by each of the following formulae is more preferable.

$$Li_gCoO_k \tag{MA-1}$$

$$Li_gNiO_k \tag{MA-2}$$

$$Li_gMnO_k \tag{MA-3}$$

$$Li_gCo_jNi_{1-j}O_k \tag{MA-4}$$

$$LiNi_jMn_{1-j}O_k \tag{MA-5}$$

$$LiCo_jNi_iAl_{1-j-i}O_k \tag{MA-6}$$

$$LiCo_jNi_iMn_{1-j-i}O_k \tag{MA-7}$$

In the formulae (MA-1) to (MA-7), g has the same definition as a described above. j represents 0.1 to 0.9. i represents 0 to 1, in which 1-j-i represents 0 or more. k has the same definition as b. Specific examples of the transition metal compound include $LiCoO_2$ (lithium cobalt oxide), $LiNi_2O_2$ (lithium nickel oxide), $LiNi_{0.85}Co_{0.01}Al_{0.05}O_2$ (lithium nickel cobalt aluminum oxide), $LiNi_{0.33}Co_{0.33}Mn_{0.33}O_2$ (lithium nickel manganese cobalt oxide), and $LiNi_{0.5}Mn_{0.5}O_2$ (lithium manganese nickel oxide).

Preferable examples of the transition metal oxide represented by the formula (MA) also include compounds represented by the following formula (some of the compounds are the same as the above-described examples, but different symbols are used)

(i) $LiNi_xMn_yCo_zO_2$ ($x>0.2$, $y>0.2$, $z\geq 0$, $x+y+z=1$) representative example:

$$LiNi_{1/3}Mn_{1/3}Co_{1/3}O_2$$

$$LiNi_{1/2}Mn_{1/2}O_2$$

(ii) $LiNi_xCo_yAl_zO_2$ ($x>0.7$, $y>0.1$, $0.1>z>0.05$, $x+y+z=1$) representative example:

$$LiNi_{0.8}Co_{0.15}Al_{0.05}O_2$$

[Transition Metal Oxide Represented by Formula (MB) (Spinel Structure)]

As the lithium-containing transition metal oxide, a compound represented the following formula (MB) is also preferable.

$$Li_cM^2_2O_d \tag{MB}$$

In the formula (MB), $M^2$ has the same definition as Ma described above. c represents 0.02 to 2 and preferably 0.6 to 1.5. d represents 3 to 5 and preferably 4.

As the transition metal oxide represented by the formula (MB), a compound represented by each of the following formulae is more preferable.

$$Li_mMn_2O_n \tag{MB-1}$$

$$LiMn_pAl_{2-p}O_n \tag{MB-2}$$

$$LiMn_pNi_{2-p}O_n \tag{MB-3}$$

m has the same definition as c. n has the same definition as d. p represents 0 to 2. Specific examples of the transition metal compound include $LiMn_2O_4$ and $LiMn_{1.5}Ni_{0.5}O_4$.

Preferable examples of the transition metal oxide represented by the formula (MB) also include compounds represented by the following formulae.

$$LiCoMnO_4 \tag{a}$$

$$Li_2FeMn_3O_8 \tag{b}$$

$$Li_2CuMn_3O_8 \tag{c}$$

$$Li_2CrMn_3O_8 \tag{d}$$

$$Li_2NiMn_3O_8 \tag{e}$$

From the viewpoints of high capacity and high output, an electrode containing Ni is still more preferable among the above-described electrodes. Here, the a, c, g, and m values and an e value described below are values before the start of charging and discharging and are values which are increased and decreased due to charging and discharging.

[Transition Metal Oxide Represented by Formula (MC)]

As the lithium-containing transition metal oxide, a lithium-containing transition metal phosphorus oxide is preferably used, and a compound represented by the following formula (MC) is more preferable.

$$Li_e M^3 (PO4)_f \qquad (MC)$$

In the formula (MC), e represents 0 to 2 and preferably 0.5 to 1.5. f represents 1 to 5 and preferably 0.5 to 2.

$M^3$ represents one or more elements selected from V, Ti, Cr, Mn, Fe, Co, Ni, and Cu. $M^3$ may be substituted with other metals such as Ti, Cr, Zn, Zr, or Nb instead of the mixing element $M^b$. Specific examples of $M^3$ include olivine-type iron phosphates such as $LiFePO_4$ and $Li_3Fe_2(PO_4)_3$; iron pyrophosphates such as $LiFeP_2O_7$; cobalt phosphates such as $LiCoPO_4$; and monoclinic NASICON type vanadium phosphates such as $Li_3V_2(PO_4)_3$ (lithium vanadium phosphate).

In the present invention, as the positive electrode active material, a material capable of maintaining normal use at a positive electrode potential (vs. Li/Li$^+$) of 4.25 V or higher is preferably used. Being capable of maintaining normal use described herein represents that a battery does not become unused due to deterioration of an electrode material even when being charged at the above voltage, and this potential may also be referred to as "normal-usable potential". This potential may also be referred to simply as "positive electrode potential". The positive electrode potential (normal-usable potential) is more preferably 4.3 V or higher. The upper limit of the positive electrode potential is not particularly limited, but is practically 5 V or lower.

In the above-described range, cycle characteristics and high-rate discharging characteristics can be improved.

[Method of Measuring Electrode Potential (vs. Li/Li$^+$)]

During charging, the positive electrode potential is calculated from the following expression.

(Positive Electrode Potential)=(Negative Electrode Potential)+(Battery Voltage) When lithium titanate is used as the negative electrode, the negative electrode potential is 1.55 V. When graphite is used as the negative electrode, the negative electrode potential is 0.1 V. During charging, the battery voltage is observed, and the positive electrode potential is calculated therefrom.

In the non-aqueous secondary battery according to the present invention, the average particle size of the positive electrode active material to be used is not particularly limited but is preferably 0.1 μm to 50 μm. The specific surface area is not particularly limited but is preferably 0.01 m$^2$/g to 50 m$^2$/g when measured using the BET method. In addition, when 5 g of the positive electrode active material is dissolved in 100 ml of distilled water, the pH of the supernatant liquid is preferably 7 to 12.

In order for the positive electrode active material to have the predetermined particle size, a well-known pulverizer or classifier is used. For example, a mortar, a ball mill, a vibration ball mill, a vibration mill, a satellite ball mill, a planetary ball mill, a swirling air flow jet mill, or a sieve is used. The positive electrode active material obtained using the calcination method may be used after being washed with water, an acidic aqueous solution, an alkaline aqueous solution, or an organic solvent.

The mixing amount of the positive electrode active material is not particularly limited, but the mixing amount in the dispersion (mixture) constituting the active material layer is preferably 60 mass % to 98 mass % and more preferably 70 mass % to 95 mass % with respect to 100 mass % of the solid components.

Negative Electrode Active Material

The negative electrode active material is not particularly limited as long as it can reversibly store and release lithium ions, and examples thereof include carbonaceous materials; metal oxides such as tin oxide and silicon oxide; metal composite oxides; lithium and lithium alloys such as a lithium-aluminum alloy; and metals capable of forming an alloy with lithium, such as Sn and Si.

Among these, one kind may be used alone, or two or more kinds may be used in an arbitrary combination at an arbitrary ratio. Among these, a carbonaceous material or a lithium metal composite oxide is preferably used.

In addition, the metal composite oxide is not particularly limited as long as it can store and release lithium, but it is preferable that the metal composite oxide contains titanium and/or lithium as a constituent element from the viewpoint of high current density charging-discharging characteristics.

The carbonaceous material which is used as the negative electrode active material is a material substantially containing carbon. "Substantially containing carbon" described herein represents containing other elements within a range where the effects of the present invention do not deteriorate, in which the content of other elements is preferably 0.1 mol % or less (in terms of mole number) and more preferably 0.01 mol % or less. The lower limit of the content is not particularly limited, but is practically 0.0001 mol % or more. Examples of the carbonaceous material include petroleum pitch, natural graphite, artificial graphite such as vapor-grown graphite, and carbonaceous materials obtained by firing various synthetic resins such as PAN resins and furfuryl alcohol resins. Further, other examples of the carbonaceous material include various carbon fibers such as PAN (polyacrylonitrile)-based carbon fibers, cellulose-based carbon fibers, pitch-based carbon fibers, vapor-grown carbon fibers, dehydrated PVA (polyvinyl alcohol)-based carbon fibers, lignin carbon fibers, vitreous carbon fibers, and activated carbon fibers; mesophase microspheres; graphite whiskers; and tabular graphite.

These carbonaceous materials can be classified into non-graphitizable carbonaceous materials and graphitizable carbonaceous materials based on the graphitization degree. In addition, it is preferable that the carbonaceous material has the lattice spacing, density, and crystallite size described in JP1987-22066A (JP-S62-22066A), JP1990-6856A (JP-H2-6856A), and JP1991-45473A (JP-H3-45473A). The carbonaceous material is not necessarily a single material and, for example, may be a mixture of natural graphite and artificial graphite described in JP1993-90844A (JP-H5-90844A) or graphite having a coating layer described in JP 1994-4516A (JP-H6-4516A).

The metal oxide and the metal composite oxide, which are used as the negative electrode active materials, are not particularly limited as long as at least one thereof is included. The metal oxide and the metal composite oxide are more preferably amorphous oxides. Further, chalcogenides which are reaction products between metal elements and elements in Group 16 of the periodic table) are preferably used. "Amorphous" described herein represents an oxide having a broad scattering band with a peak in a range of 20° to 40° in terms of 2θ when measured by an X-ray diffraction method using CuKα rays, and the oxide may have a crystal diffraction line. The highest intensity in a crystal diffraction line observed in a range of 40° to 70° in terms of 2θ is preferably 100 times or less and more preferably 5 times or less relative to the intensity of a diffraction peak line in a broad scattering band observed in a range of 20° to 40° in terms of 2θ, and it is still more preferable that the oxide does not have a crystal diffraction line.

In a group of compounds consisting of the amorphous oxides and the chalcogenides, amorphous oxides and chalcogenides of metalloid elements are more preferable, and oxides and chalcogenides formed of a single element or a combination of two or more elements selected from elements in Groups 13 (IIIB) to 15 (VB) of the periodic table, Al, Ga, Si, Sn, Ge, Pb, Sb, and Bi are still more preferable. Specifically, preferable examples of the amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, composite oxides of these examples with lithium oxide (for example, $Li_2SnO_2$) may be used.

In the non-aqueous secondary battery, the average particle size of the negative electrode active material to be used is preferably 0.1 μm to 60 μm. In order to obtain the predetermined particle size, a well-known pulverizer or classifier is used. For example, a mortar, a ball mill, a sand mill, a vibration ball mill, a satellite ball mill, a planetary ball mill, a swirling air flow jet mill, or a sieve is preferably used. During the pulverization, wet pulverization of causing water or an organic solvent such as methanol to coexist with the negative electrode active material can be optionally performed. In order to obtain a desired particle size, it is possible to perform classification. A classification method is not particularly limited, and a method using, for example, a sieve or an air classifier can be optionally used. The classification can be used using a dry method or a wet method.

The chemical formula of the compound obtained using the calcination method can be obtained by using inductively coupled plasma (ICP) optical emission spectroscopy as a measurement method, or can be calculated from a mass difference of the powder before and after calcination as a short-cut method.

Preferable examples of the negative electrode active material which can be used in combination with the amorphous oxide as negative electrode active material containing Sn, Si, or Ge as a major component include carbon materials that can store and release lithium ions or lithium metal; lithium; lithium alloys; and metals that can form an alloy with lithium.

In the present invention, lithium titanate, more specifically, lithium titanium oxide ($Li[Li_{1/3}Ti_{5/3}]O_4$) can be preferably used as the negative electrode active material.

The mixing amount of the negative electrode active material is not particularly limited, but the mixing amount in the dispersion (mixture) constituting the active material layer is preferably 60 mass % to 98 mass % and more preferably 70 mass % to 95 mass % with respect to 100 mass % of the solid components.

Conductive Material

Any electron conductive materials can be used as the conductive material as long as they do not cause a chemical change in a constructed non-aqueous secondary battery, and a well-known conductive material can be arbitrarily used. Typically, one kind or a mixture of two or more kinds can be used among the following conductive materials including: natural graphite (for example, scale-like graphite, flaky graphite, or amorphous graphite), artificial graphite, carbon black, acetylene black, Ketjen black, carbon fibers, metal powders (for example, copper, nickel, aluminum, or silver (described in JP1988-10148A (JP-S63-10148A) and JP1988-554A (JP-S63-554A), metal fibers, and polyphenylene derivatives (described in JP1984-20A (JP-S59-20A) and JP1984-971A (JP-S59-971A). Among these, a combination of graphite and acetylene black is more preferable. The addition amount of the conductive material in the dispersion (mixture) constituting the active material layer is preferably 0.1 mass % to 50 mass % and more preferably 0.5 mass % to 30 mass % with respect to 100 mass % of the solid components. The addition amount of carbon black or natural graphite in the dispersion is more preferably 0.5 mass % to 15 mass %.

Binder

Examples of the binder include polysaccharides, thermoplastic resins, and polymers having rubber elasticity. Preferable examples of the binder include emulsions (latexes) or suspensions of starch, carboxymethyl cellulose, cellulose, diacetyl cellulose, methyl cellulose, hydroxyethyl cellulose, hydroxypropyl cellulose, sodium alginate, polyacrylic acid, sodium polyacrylate, water-soluble polymers (for example, polyvinyl phenol, polyvinyl methyl ether, polyvinyl alcohol, polyvinyl pyrrolidone, polyacrylonitrile, polyacrylamide, polyhydroxy (meth)acrylate, and a styrene-maleic acid copolymer), polyvinyl chloride, polytetrafluoroethylene, polyvinylidene fluoride, a tetrafluoroethylene-hexafluoropropylene copolymer, a vinylidene fluoride- tetrafluoroethylene-hexafluoropropylene copolymer, polyethylene, polypropylene, an ethylene-propylene- diene terpolymer (EPDM), a sulfonated EPDM, a polyvinyl acetal resin, (meth)acrylic acid ester copolymers containing a (meth)acrylic acid ester (for example, methyl methacrylate and 2-ethylhexyl acrylate), a (meth)acrylic acid ester-acrylonitrile copolymer, a polyvinyl ester copolymer containing a vinyl ester (for example, vinyl acetate), a styrene-butadiene copolymer, an acrylonitrile-butadiene copolymer, polybutadiene, a neoprene rubber, a fluorine rubber, poly(ethylene oxide), a polyester polyurethane resin, a polyether polyurethane resin, a polycarbonate polyurethane resin, a polyester resin, a phenolic resin, and an epoxy resin. More preferable examples of the binder include a polyacrylic acid ester latex, carboxymethyl cellulose, polytetrafluoroethylene, and polyvinylidene fluoride.

As the binder, one kind can be used alone, or a mixture of two or more kinds can be used. The addition amount of the binder in the dispersion (mixture) constituting the active material layer is preferably 1 mass % to 30 mass % and more preferably 2 mass % to 10 mass % with respect to 100 mass % of the solid components. In the above-described range, the holding force and cohesive force of the respective components in the dispersion can be appropriately maintained.

Filler

As a material forming the filler, any fibrous materials can be used as long as they do not cause a chemical change in the non-aqueous secondary battery according to the present invention. Typically, fibrous fillers formed from olefin polymers such as polypropylene and polyethylene, and materials such as glass and carbon are used. The addition amount of the filler is not particularly limited, but the addition amount in the dispersion (mixture) constituting the active material layer is preferably 0 mass % to 30 mass % with respect to 100 mass % of the solid components.

Current Collector

As the current collectors of the positive and negative electrodes, an electron conductor that does not cause a chemical change in the non-aqueous secondary battery according to the present invention is used.

As the current collector of the positive electrode, aluminum, stainless steel, nickel, titanium, or aluminum or stainless steel surface-treated with carbon, nickel, titanium, or silver is preferable. Among these, aluminum or an aluminum alloy is more preferable.

As the current collector of the negative electrode, aluminum, copper, stainless steel, nickel, or titanium is preferable, and aluminum copper, or a copper alloy is more preferable.

Regarding the shape of the current collector, a film sheet-shaped current collector is usually used, but a net-shaped material, a material formed by punching, a lath material, a porous material, a foam, a material obtained by molding a group of fibers, and the like can also be used. The thickness of the current collector is not particularly limited but is preferably 1 µm to 500 µm. In addition, it is also preferable that the surface of the current collector is made to be uneven through a surface treatment.

(Separator)

The separator which can be used in the present invention is not particularly limited as long as it is formed of a material that electronically insulates the positive electrode and the negative electrode and has mechanical strength, ion permeability, and oxidation-reduction resistance at a contact surface between the positive electrode and the negative electrode. As such a material, for example, a porous polymer material, an inorganic material, an organic-inorganic hybrid material, or a glass fiber is used. In order to secure safety, it is preferable that the separator has a shutdown function, that is, a function of interrupting the current by blocking pores at 80° C. or higher to increase resistance. The blocking temperature is preferably 90° C. to 180° C.

The shape of the pores of the separator is typically circular or elliptical, and the size thereof is 0.05 µm to 30 µm and preferably 0.1 µm to 20 µm. Further, the shape of the pores may be rod-like or indefinite as in a case where a separator is prepared using a drawing method or a phase separation method. An occupancy ratio of the pores, that is, a porosity is 20% to 90% and preferably 35% to 80%.

As the polymer material, a single material such as cellulose non-woven fabric, polyethylene, or polypropylene may be used alone, and a composite material of two or more kinds may be used. A laminate of two or more microporous films having different pore sizes, porosities, and pore blocking temperatures is preferable. The thickness is preferably 5 µm to 30 µm.

As the inorganic material, an oxide such as alumina or silicon dioxide, a nitride such as aluminum nitride or silicon nitride, or a sulfate such as barium sulfate or calcium sulfate is used, and the shape thereof is particulate or fibrous. The form of the inorganic material may be a thin film-shaped material such as a non-woven fabric, a woven fabric, or a microporous film. As the thin film-shaped material, a material having a pore size of 0.01 µm to 1 µm and a thickness of 5 µm to 50 µm is preferably used. In addition to the above-described independent thin film-shaped material, a separator in which a composite porous layer containing particles of the above-described inorganic material is formed on a surface layer of the positive electrode and/or the negative electrode using a binder formed of a resin can be used. For example, a porous layer containing alumina particles having a 90% particle size of less than 1 µm is formed on both surfaces of the positive electrode using a binder formed of a fluororesin.

(Preparation of Non-Aqueous Secondary Battery)

As described above, the non-aqueous secondary battery according to the present invention may have any shape such as a bottomed cylindrical shape, a sheet shape, or a bottomed square shape. In many cases, the current collector is coated with the dispersion containing the positive electrode active material or the negative electrode active material, is dried, and is compressed to be used.

Figure 2:
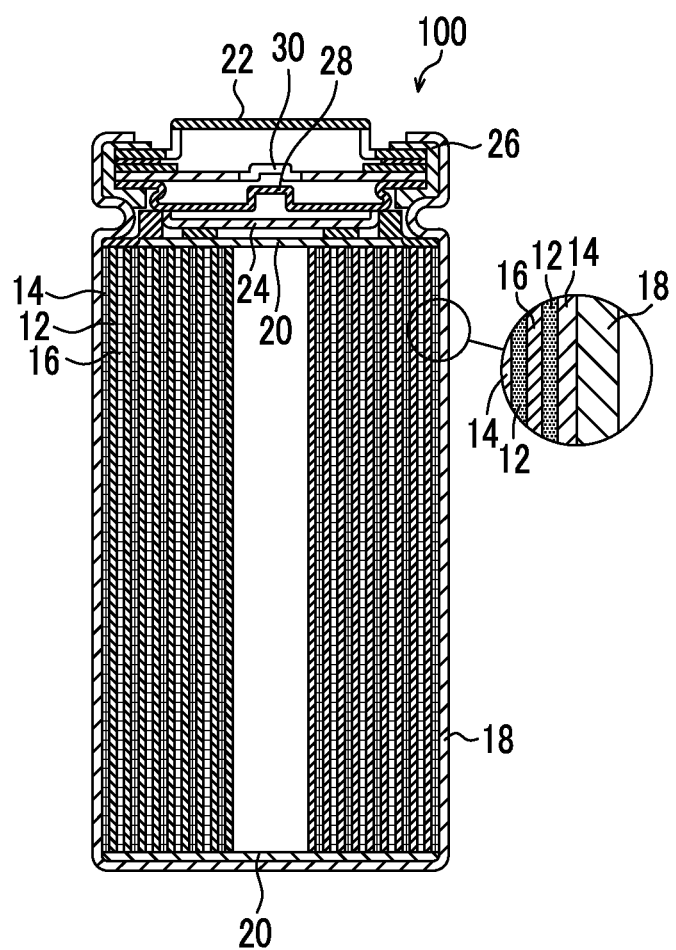
FIG. 2 is a cross-sectional view showing a specific mechanism of the lithium ion secondary battery according to the preferred embodiment of the present invention.

Hereinafter, the configuration and preparation method of the bottomed cylindrical lithium ion secondary battery 100 will be described as an example with reference to FIG. 2. In a bottomed cylindrical battery, the outer surface area relative to a power generating element to be charged is reduced. Therefore, the battery preferably has a design in which Joule's heat generated due to internal resistance during charging or discharging is efficiently dissipated to the outside. In addition, the battery preferably has a design in which the packing ratio of a material having high thermal conductivity is improved so as to decrease an internal temperature distribution. In this bottomed cylindrical lithium ion secondary battery 100, a wound laminate where a positive electrode sheet 14 and a negative electrode sheet 16 are superimposed with a separator 12 interposed therebetween is accommodated in an outer can 18. In the drawing, reference numeral 20 represents an insulating plate, reference numeral 22 represents a sealing plate, reference numeral 24 represents a positive electrode current collector, reference numeral 26 represents a gasket, reference numeral 28 represents a pressure-sensitive valve, and reference numeral 30 represents a current interrupting element. In an enlarged circle, a hatched portion is different from that of the overall diagram in consideration of visibility, but the respective components represented by reference numerals corresponds to those in the overall diagram.

In a preferable method of manufacturing a non-aqueous secondary battery, first, the negative electrode active material and various additives including the binder, the filler, and the like which are optionally used are dissolved in an organic solvent to obtain a mixture. As a result, a slurry or paste negative electrode mixture is prepared. The entire region of both surfaces of a metal core as a current collector is uniformly coated with the obtained negative electrode mixture. Next, the organic solvent is removed, and a negative electrode active material layer is formed. Further, the laminate (negative electrode mixture) of the current collector and the negative electrode active material layer is rolled using a roll press machine. As a result, a negative electrode sheet (electrode sheet) having a predetermined thickness is prepared. At this time, conventional methods can be used as the coating method of the respective materials, the drying method of the coated material, and the forming method of the positive and negative electrodes.

In the embodiment, the cylindrical battery has been described as an example, but the present invention is not limited thereto. For example, after the positive and negative electrode sheets (electrode mixtures) prepared using the above-described method are superimposed with the separator interposed therebetween, the laminate may be processed into a sheet-shaped battery as it is. Alternatively, the laminate may be folded and inserted into a square can so as to electrically connect the can and the sheet to each other, and then an electrolytic solution is injected thereto, and an opening is sealed using the sealing plate, thereby forming a square battery.

In all the embodiments, a safety valve can be used as the sealing plate for sealing the opening. In addition, as a sealing component, various well-known safety elements of the related art may be provided in addition to the safety valve. For example, as an overcurrent preventing element, for example, a fuse, a bimetal, or a PTC element is preferably used.

In addition, in addition to the safety valve, as a countermeasure against an increase in the internal pressure of the battery can, a method of forming a slit in the battery can, a gasket cracking method, a sealing plate cracking method, or a method of disconnecting a lead plate can be used. In addition, a protective circuit into which an overcharge or overdischarge preventing mechanism is embedded is provided to a charger or is separately connected to a charger.

As the battery can or the lead plate, an electrically conductive metal or alloy can be used. For example, a metal such as iron, nickel, titanium, chromium, molybdenum, copper or aluminum or an alloy thereof is preferably used.

As a welding method of a cap, a can, a sheet, or a lead plate, a well-known method (for example, DC or AC electric welding, laser welding, or ultrasonic welding) can be used. As a sealing agent for sealing the opening, a well-known compound of the related art such as asphalt or a mixture can be used.

[Use of Non-Aqueous Secondary Battery]

The non-aqueous secondary battery according to the present invention is superior in cycle characteristics and high-rate discharging characteristics and is applied to various uses. In particular, the non-aqueous secondary battery according to the present invention is preferably used in an application where high-capacity and high-rate discharging characteristics are required. It is assumed that, when being mounted on an electric vehicle or the like, a high-capacity secondary battery is charged every day at home. In addition, high-rate discharging is necessary during departure and acceleration, and it is important to prevent the high-rate discharge capacity from deteriorating even during repeated charging and discharging. In such an usage environment, the non-aqueous secondary battery according to the present invention can be suitably used and can exhibit the superior effects.

Regarding other application embodiments, examples of an electronic apparatus to which the non-aqueous secondary battery is applied include a laptop computer, a pen-input PC, a mobile PC, an electronic book player, a mobile phone, a cord-less phone system, a pager, a handy terminal, a portable fax, a portable copying machine, a portable printer, a head-phone stereo set, a video camera, a liquid crystal television, a handy cleaner, a portable CD player, a mini disc player, an electric shaver, a transceiver, an electronic organizer, an electronic calculator, a memory card, a portable tape recorder, a radio player, a backup power supply, and a memory card. In addition, examples of an electronic apparatus for consumer use include an electromotive vehicle, a motor, a lighting device, a toy, a game device, a load conditioner, a timepiece, a strobe, a camera, and a medical device (for example, a pacemaker, a hearing aid, or a shoulder massager). In addition, the non-aqueous secondary battery can be used in combination with a solar battery.

A metal ion which is used for transporting a charge in the non-aqueous secondary battery according to the present invention is not particularly limited, and it is preferable that a metal ion in Group 1 or Group 2 in the periodic table is used. Among these, for example, a lithium ion, a sodium ion, a magnesium ion, a calcium ion, or an aluminum ion is preferably used, and a lithium ion is more preferably used. Regarding a secondary battery using a lithium ion, general technical features can refer to various documents and publications such as Patent Documents which are described above at the beginning of this specification. Regarding a secondary battery using a sodium ion, for example, general technical features can refer to Journal of Electrochemical Society; and Electrochemical Science and Technology, United States, 1980, Vol. 127, pp. 2097 to 2099. Regarding a secondary battery using a magnesium ion, for example, general technical features can refer to Nature pp. 407, 724 to 727 (2000). Regarding a secondary battery using a calcium ion, for example, general technical features can refer to J. Electrochem. Soc. Vol. 138, 3536 (1991). It is preferable that the present invention is applied to a lithium ion secondary battery because the lithium ion secondary battery is widely used. Even when the present invention is applied to other batteries, the desired effects can be exhibited, and the present invention is not limited to a lithium ion secondary battery.

EXAMPLES

Hereinafter, examples of the present invention will be described, but the present invention is not limited to these examples.

Preparation of Electrolytic Solution

1 M $LiPF_6$ was dissolved in a mixed solvent of ethylene carbonate and methyl ethyl carbonate (volume ratio=1:1), and the respective components were added to the solution in amounts shown in Table 1. As a result, test electrolytic solutions 101 to 127 and c11 to c14 were prepared.

Preparation of 2032-Type Coin Battery

A positive electrode was prepared from the following composition including: 85 mass % of lithium nickel manganese cobalt oxide as an active material; 7 mass % of carbon black as a conductive material; and 8 mass % of polyvinylidene fluoride as a binder. A negative electrode was prepared from the following composition including: 86 mass % of graphite as an active material; 6 mass % of carbon black as a conductive material; and polyvinylidene fluoride as a binder. As a separator, polypropylene having a thickness of 25 μm was used. Using the positive electrode, the negative electrode, and the separator, a 2032-type coin battery was prepared for each of the test electrolytic solutions 101 to 127 and c11 to c14 and was evaluated for the following items. The results are shown in Table 1 below.

<Cycle Characteristics—300 Cycles>

In a thermostatic chamber at 60° C., the 2032-type battery prepared using the above-described method was charged at a constant current of 1 C (4.0 mA) until the battery voltage reached 4.5 V. The battery was continuously charged at the constant voltage of 4.5 V until the current value reached 0.12 mA (however, the upper limit of the charging time was set as 2 hours). Next, the battery was discharged at a constant current of 1 C(4.0 mA) until the battery voltage reached 2.75 V. These operations were set as one cycle. This cycle was repeated 300 times, and the discharge capacity (mAh) after 300 cycles was measured. The discharge capacity retention ratio was calculated from the above result according to the following expression.

Discharge Capacity Retention Ratio (%)=(Discharge Capacity after 300 Cycles/discharge capacity after 1 Cycle)×100

<High-Rate Discharging Characteristics—300 Cycles>

The battery which underwent the 300-cycle test using the above-described method was charged at a constant current of 1 C (4.0 mA) until the battery voltage reached 2.85 V. Next, the battery was charged at the constant voltage of 2.85 V until the current value reached 0.02 mA. When the battery was fully charged, the charge electrical quantity was measured. Next, the battery was discharged at a constant current of 4 C (16.0 mA) until the battery voltage reached 1.2 V, the discharge electrical quantity (mAh) during high-rate discharging was measured, and the high-rate discharge efficiency was calculated according to the following expression.

High-Rate Discharge Efficiency (%)=(4 C Discharge Electrical Quantity/Charge Electrical Quantity During Full Charge)×100

TABLE 1

| No. | Organic Metal Compound | Addition Amount (mol/L) | Additive | Addition Amount (mol/L) | Cycle Characteristics/ 300 Cycles | 4 C Discharge Efficiency/ 300 Cycles |
|---|---|---|---|---|---|---|
| 101 | II-1 | 0.008 | | | 65 | 42.3 |
| 102 | II-5 | 0.006 | | | 61 | 39.7 |
| 103 | III-1 | 0.002 | | | 60 | 39.0 |
| 104 | III-3 | 0.005 | | | 65 | 46.2 |
| 105 | IV-2 | 0.003 | | | 70 | 49.0 |
| 106 | IV-3 | 0.005 | | | 72 | 50.4 |
| 107 | IV-9 | 0.004 | | | 71 | 51.1 |
| 108 | IV-11 | 0.008 | | | 69 | 49.0 |
| 109 | IV-13 | 0.009 | | | 70 | 49.7 |
| 110 | V-1 | 0.06 | | | 63 | 39.1 |
| 111 | V-2 | 0.012 | | | 66 | 44.9 |
| 112 | V-4 | 0.002 | | | 66 | 45.5 |
| 113 | IV-3 | 0.55 | | | 50 | 34.5 |
| 114 | IV-3 | 0.5 | | | 60 | 41.4 |
| 115 | IV-3 | 0.1 | | | 65 | 44.9 |
| 116 | IV-3 | 0.02 | | | 70 | 48.3 |
| 117 | II-1 | 0.008 | Aex1 | 0.18 | 70 | 45.5 |
| 118 | II-5 | 0.006 | Aex2 | 0.2 | 72 | 46.8 |
| 119 | III-1 | 0.002 | Eex7 | 0.15 | 63 | 41.0 |
| 120 | III-3 | 0.005 | Aex2 | 0.15 | 68 | 48.3 |
| 121 | IV-2 | 0.003 | Hex1 | 0.1 | 75 | 52.5 |
| 122 | IV-3 | 0.005 | Hex1 | 0.1 | 78 | 54.6 |
| 123 | IV-3 | 0.005 | Eex11 | 0.15 | 76 | 53.2 |
| 124 | IV-9 | 0.004 | Bex1 | 0.2 | 73 | 52.6 |
| 125 | V-1 | 0.06 | Aex2 | 0.2 | 68 | 42.2 |
| 126 | V-2 | 0.012 | Gex1 | 0.15 | 71 | 48.3 |
| 127 | V-4 | 0.002 | Aex2 | 0.2 | 69 | 47.6 |
| c11 | None | | | | 42 | 21.8 |
| c12 | J-1 | 0.01 | | | 45 | 35.6 |
| c13 | J-2 | 0.01 | | | 44 | 17.2 |
| c14 | J-3 | 0.005 | | | Insoluble* | |

*Insoluble represents that the added compound is not completely dissolved such that an electrolytic solution having a target concentration cannot be obtained.

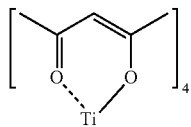

J-1

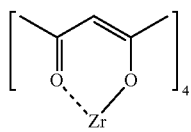

J-2

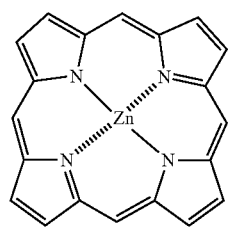

J-3

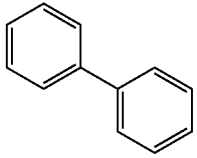

Aex1

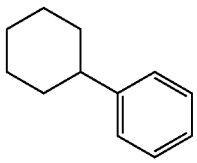

Aex2

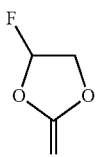

Bex1

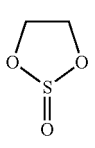

Eex7

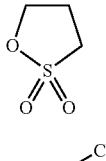

Eex11

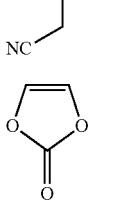

Gex1

Hex1

It can be seen from the results of Table 1 that, in the non-aqueous secondary batteries prepared using the electrolytic solutions (101 to 127) according to the present invention, cycle characteristics and high-rate discharging characteristics were able to be improved. In particular, when the electrolytic solutions 106 to 109 were used, superior results were obtained.

On the other hand, it can be seen that, in the non-aqueous secondary batteries prepared using the electrolytic solutions (c11 to c13) other than those according to the present invention, cycle characteristics and high-rate discharging characteristics were poor. It can be seen that, in the organic metal compound J-3 added to the electrolytic solution c14, the solubility in the electrolytic solution was low, and the manufacturing suitability was low.

The present invention has been described using the embodiments. However, unless specified otherwise, any of the details of the above description is not intended to limit the present invention and can be construed in a broad sense within a range not departing from the concept and scope of the present invention disclosed in the accompanying claims.

What is claimed is:

1. An electrolytic solution for a non-aqueous secondary battery comprising:
   an organic metal compound;
   an electrolyte; and
   an organic solvent,
   wherein the organic metal compound includes a central metal and a multidentate ligand,
   a metal element in the central metal is selected from the group consisting of Group 4 transition elements, Group 5 transition elements, Group 6 transition elements, Group 7 transition elements, Group 8 transition elements, Group 11 transition elements, Group 12 transition elements, and rare earth metal elements, and
   the multidentate ligand includes an oxygen atom bonded to the central metal, and a nitrogen atom or a sulfur atom bonded to the central metal.

2. The electrolytic solution for a non-aqueous secondary battery according to claim 1,
   wherein the organic metal compound is a compound represented by the following formula (1),

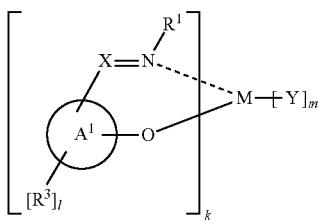
(1)

where in the formula (1), M represents the central metal, with a metal element in the central metal being selected from the group consisting of Group 4 transition elements, Group 5 transition elements, Group 6 transition elements, Group 7 transition elements, Group 8 transition elements, Group 11 transition elements, Group 12 transition elements and rare earth metal elements; $A^1$ represents an aromatic ring or an aromatic heterocyclic ring; $R^1$ represents an alkyl group, an aryl group, a heteroaryl group, or an alkenyl group; when plural $R^1$'s are present, $R^1$'s may be bonded or condensed to each other or the plural $R^1$'s may form a ring; X represents $CR^2$ or a nitrogen atom; $R^2$ represents a hydrogen atom, an alkyl group, an alkenyl group, a hydroxyl group, an alkoxy group, an aryloxy group, a thiol group, an alkylthio group, or an arylthio group; $R^1$ and $R^2$ may be bonded or condensed to each other to form a ring; $R^3$ represents a substituent; Y represents a monodentate ligand; k represents an integer of 1 to 4; l represents an integer of 0 to 3; and m represents an integer of 0 to 2.

3. The electrolytic solution for a non-aqueous secondary battery according to claim 2,
   wherein the formula (1) represents any one of the following formulae (2) to (5),

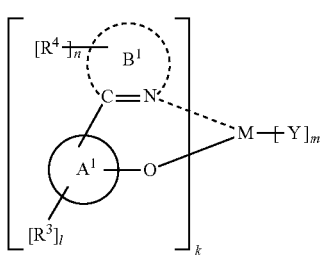
(2)

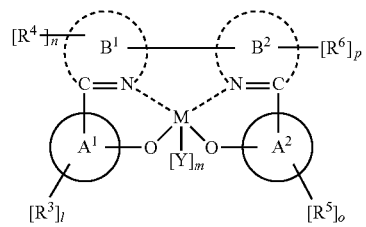
(3)

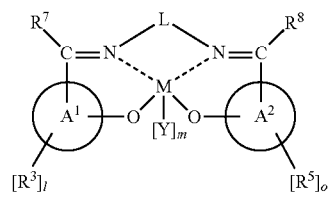
(4)

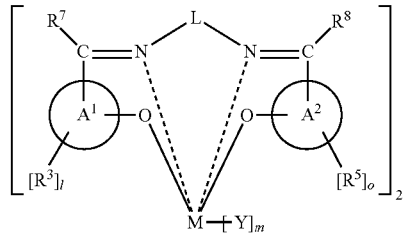
(5)

where M, $A^1$, $R^3$, Y, k, l, and m have the same definitions as those in the formula (1), respectively; $A^2$ has the same definition as $A^1$ in the formula (1); $B^1$ and $B^2$ represent a nitrogen-containing aromatic heterocyclic ring; $R^4$ to $R^6$ have the same definition as $R^3$ in the formula (1); $R^4$ and $R^6$ may be bonded or condensed to each other to form a ring with a portion of $B^1$ and $B^2$; $R^7$ and $R^8$ each independently has the same definition as $R^2$ in the formula (1); L represents an alkylene group, an arylene group, a heteroarylene group, or an alkenylene group; and n, o, and p each independently represents an integer of 0 to 3.

4. The electrolytic solution for a non-aqueous secondary battery according to claim 3,
   wherein the organic metal compound is a compound represented by the following formula (2-1), (2-2), (3-1), (3-2), (4-1), (4-2), (5-1), or (5-2),

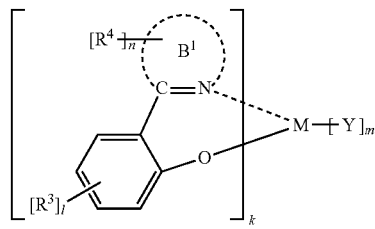
(2-1)

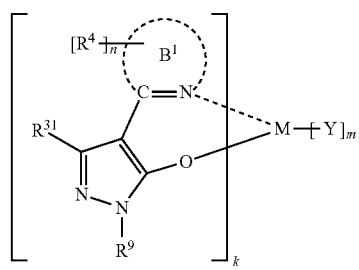
(2-2)

-continued

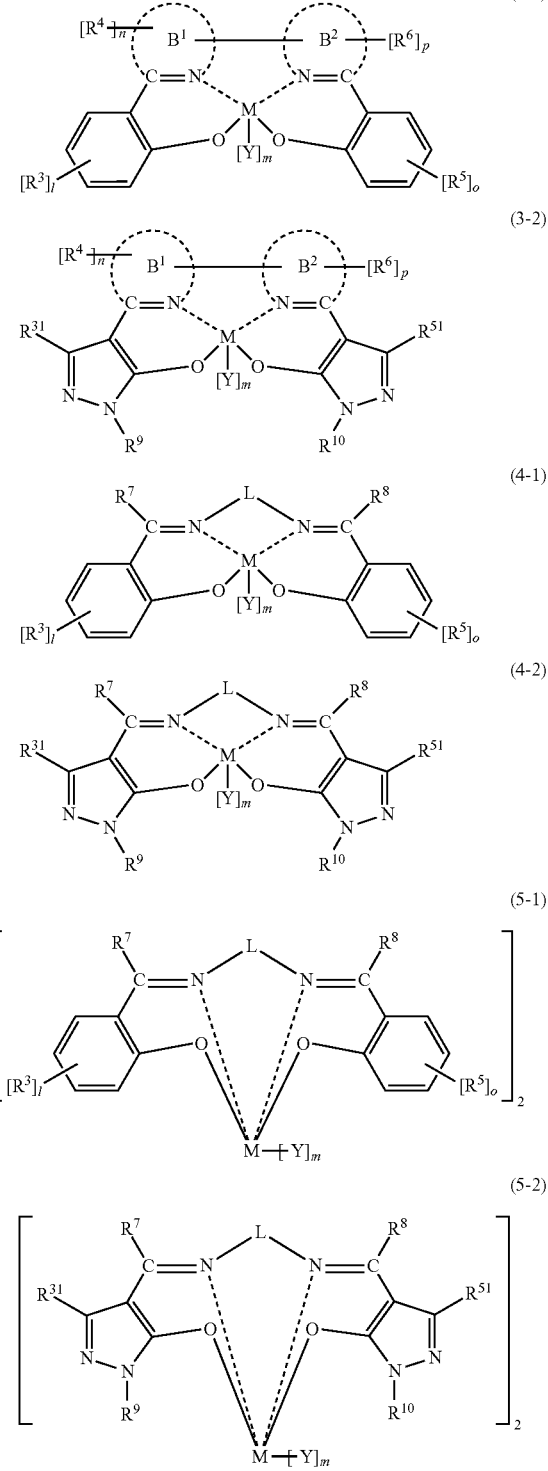

where M, $B^1$, $B^2$, $R^3$ to $R^8$, L, Y, k, l, m, n, o, and p have the same definitions as those in the formulae (2) to (5), respectively; $R^9$ and $R^{10}$ each independently represents an alkyl group, an aryl group, or a heteroaryl group; and $R^{31}$ and $R^{51}$ each independently represents the substituent represented by $R^3$ in the formula (1) or a hydrogen atom.

5. The electrolytic solution for a non-aqueous secondary battery according to claim 4,
wherein the organic metal compound is a compound represented by the formula (4-1) or (4-2).

6. The electrolytic solution for a non-aqueous secondary battery according to claim 3,
wherein L represents a cycloalkylene group or an arylene group.

7. The electrolytic solution for a non-aqueous secondary battery according to claim 1,
wherein the central metal is a transition element in Group 4 to Group 8 or a rare earth metal element.

8. The electrolytic solution for a non-aqueous secondary battery according to claim 1,
wherein the central metal is V, Cr, Ti, Zr, or Hf.

9. The electrolytic solution for a non-aqueous secondary battery according to claim 1,
wherein the content of the organic metal compound is 0.0001 mol/L to 0.5 mol/L with respect to a total amount of the electrolytic solution.

10. The electrolytic solution for a non-aqueous secondary battery according to claim 1, further comprising:
at least one of an aromatic compound, a halogen-containing compound, a phosphorus-containing compound, a sulfur-containing compound, a silicon-containing compound, a nitrile compound, and a polymerizable compound.

11. A non-aqueous secondary battery comprising:
a positive electrode;
a negative electrode; and
the electrolytic solution according to claim 1.

12. The non-aqueous secondary battery according to claim 11,
wherein the positive electrode contains an active material,
the active material contains a transition metal oxide represented by any one of the following formulae (MA) to (MC):

$$Li_aM^1O_b \quad (MA);$$

$$Li_cM^2{}_2O_d \quad (MB); \text{ and}$$

$$Li_eM^3(PO_4)_f \quad (MC),$$

where $M^1$ and $M^2$ each independently represents one or more elements selected from Co, Ni, Fe, Mn, Cu, and V; $M^3$ each independently represents one or more elements selected from V, Ti, Cr, Mn, Fe, Co, Ni, and Cu; a represents 0.02 to 1.2; b represents 1 to 3; c represents 0.02 to 2; d represents 3 to 5; e represents 0 to 2; and f represents 1 to 5.

13. The non-aqueous secondary battery according to claim 11,
wherein the positive electrode contains an active material,
the active material is lithium cobalt oxide, lithium manganese oxide, lithium nickel oxide, lithium nickel manganese cobalt oxide, lithium manganese nickel oxide, lithium nickel cobalt aluminum oxide, or lithium vanadium phosphate.

14. The non-aqueous secondary battery according to claim 11,
having 4.25 V to 5.0 V vs. $Li/Li^+$ of a charging potential during normal charging.

* * * * *